(12) United States Patent
Escuti et al.

(10) Patent No.: US 8,982,313 B2
(45) Date of Patent: Mar. 17, 2015

(54) BEAM STEERING DEVICES INCLUDING STACKED LIQUID CRYSTAL POLARIZATION GRATINGS AND RELATED METHODS OF OPERATION

(75) Inventors: Michael J. Escuti, Cary, NC (US); Jihwan Kim, Raleigh, NC (US); Chulwoo Oh, Hillsboro, OR (US); Steven Serati, Westminster, CO (US)

(73) Assignees: North Carolina State University, Raleigh, NC (US); Boulder Nonlinear Systems, Inc., Lafayette, CO (US)

( * ) Notice: Subject to any disclaimer, the term of this patent is extended or adjusted under 35 U.S.C. 154(b) by 315 days.

(21) Appl. No.: 13/387,942

(22) PCT Filed: Jul. 30, 2010

(86) PCT No.: PCT/US2010/043861
§ 371 (c)(1),
(2), (4) Date: Mar. 30, 2012

(87) PCT Pub. No.: WO2011/014743
PCT Pub. Date: Feb. 3, 2011

(65) Prior Publication Data
US 2012/0188467 A1    Jul. 26, 2012

Related U.S. Application Data

(60) Provisional application No. 61/230,227, filed on Jul. 31, 2009.

(51) Int. Cl.
*G02F 1/13*    (2006.01)
*G02B 27/28*    (2006.01)
(Continued)

(52) U.S. Cl.
CPC ............ *G02B 27/286* (2013.01); *G02F 1/1347* (2013.01); *G02F 1/292* (2013.01); *G02F 1/13476* (2013.01); *G02F 2001/291* (2013.01); *G02F 2201/16* (2013.01)
USPC .............................................. 349/202; 349/1

(58) Field of Classification Search
CPC ...... G02F 1/292; G02B 27/286; G02B 6/272; G02B 6/2706; G02B 26/0808; G02B 27/0944
USPC ........................................................ 349/202, 1
See application file for complete search history.

(56) References Cited

U.S. PATENT DOCUMENTS 5,126,869 A * 6/1992 Lipchak et al. ............... 349/202
5,986,740 A * 11/1999 Robinson et al. ............. 349/201
(Continued)

FOREIGN PATENT DOCUMENTS

WO    WO 03-083552 A1    10/2003

OTHER PUBLICATIONS

Kim, J. et al., "Wide-angle, nonmechanical beam steering using thin liquid crystal polarization gratings", Proceedings of SPIE, vol. 7093, pp. 709302-1-709302-11, Aug. 14, 2008.
(Continued)

*Primary Examiner* — Nathanael R Briggs
(74) *Attorney, Agent, or Firm* — Myers Bigel Sibley & Sajovec P.A.

(57) ABSTRACT

A beam steering apparatus includes a first beam steering stage and at least a second beam steering stage arranged in-line with the first beam steering stage. The first beam steering stage includes a first polarization grating comprising a uniaxial birefringent material having a first periodic director pattern, and the second beam steering stage includes a second polarization grating comprising a uniaxial birefringent material having a second periodic director pattern. In nonmechanical embodiments, a polarization selector may be arranged to provide a circularly polarized input beam incident on the first polarization grating. In mechanical embodiments, at least one of the first polarization grating and the second polarization grating may be operable to be independently rotated about an azimuth thereof. Related methods of operation are also discussed.

29 Claims, 14 Drawing Sheets

(51) Int. Cl.
*G02F 1/1347* (2006.01)
*G02F 1/29* (2006.01)

(56) References Cited

U.S. PATENT DOCUMENTS

2006/0103778 A1  5/2006  Ooi et al.
2008/0252888 A1* 10/2008  Wegmann et al. ............ 356/365
2009/0009668 A1*  1/2009  Tan et al. ........................ 349/1
2009/0310207 A1* 12/2009  Maestle ....................... 359/249
2011/0188120 A1  8/2011  Tabirian et al.
2011/0242461 A1 10/2011  Escuti et al.
2011/0262844 A1 10/2011  Tabirian et al.

OTHER PUBLICATIONS

International Search Report, PCT/US2010/043861 and Written Opinion; Feb. 28, 2011.
International Preliminary Report on Patentability and Written Opinion, PCT Application No. PCT/US2010/043861, mailed Feb. 9, 2012.

* cited by examiner

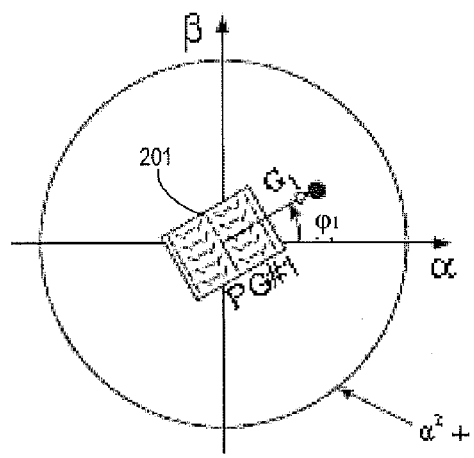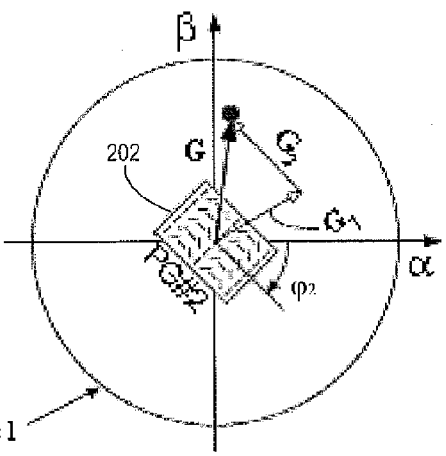
FIGURE 3A  FIGURE 3B
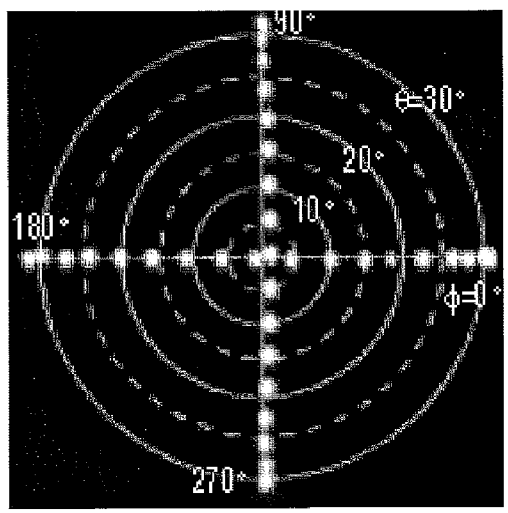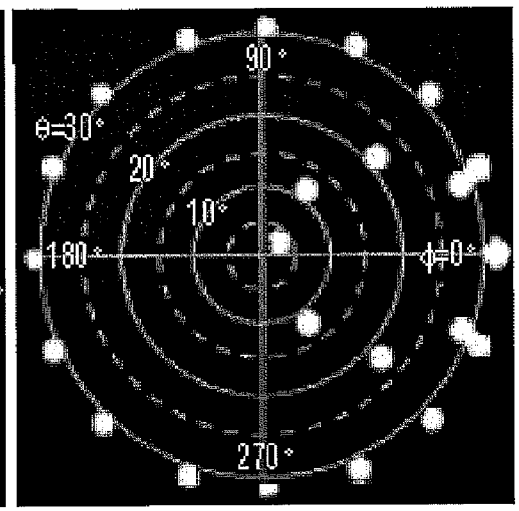
FIGURE 4A  FIGURE 4B

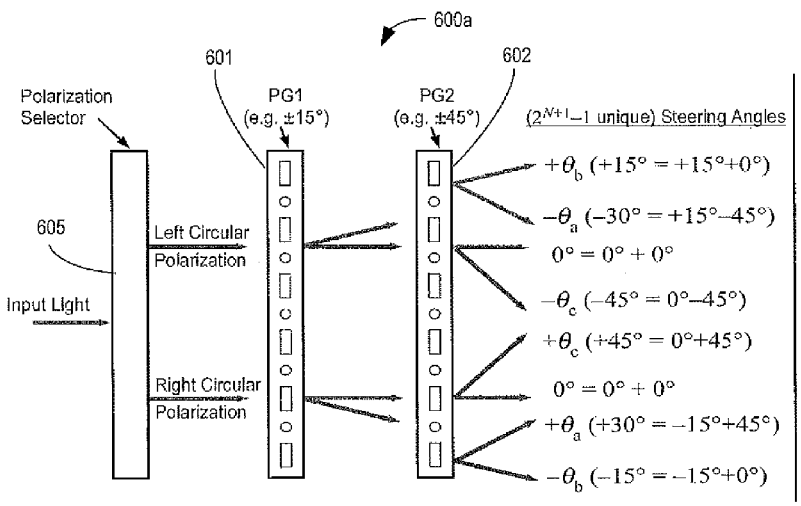 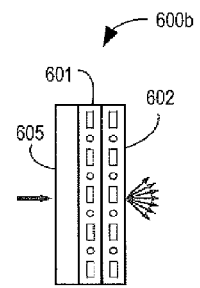
FIGURE 6A      FIGURE 6B
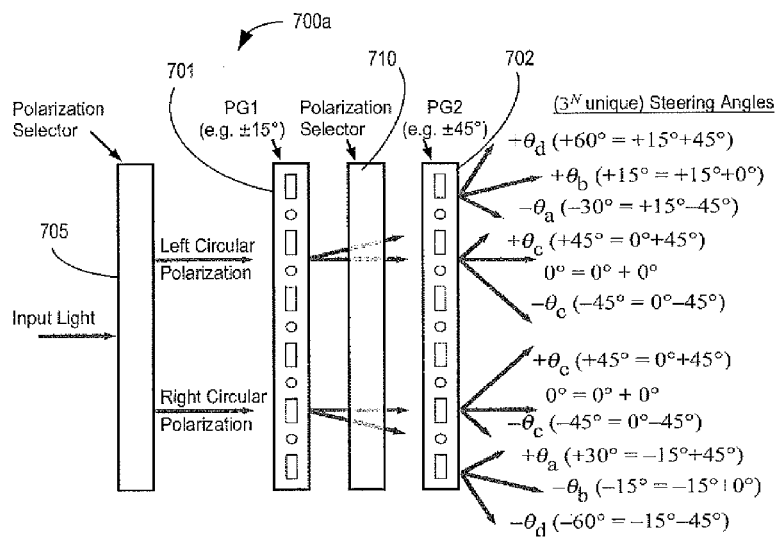 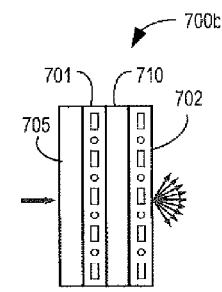
FIGURE 7A      FIGURE 7B

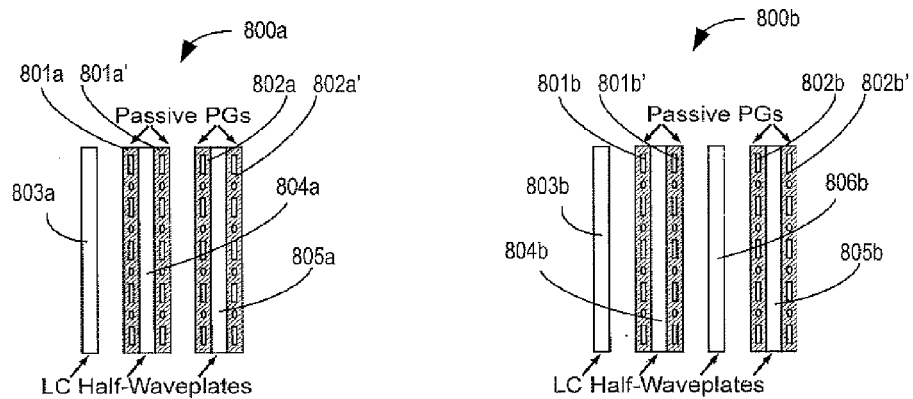
FIGURE 8A  FIGURE 8B
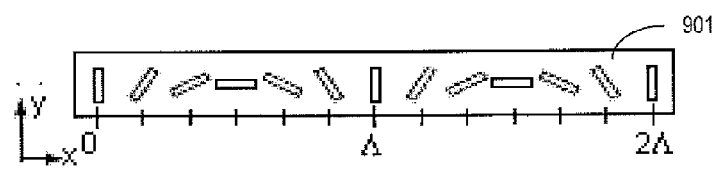
FIGURE 9A
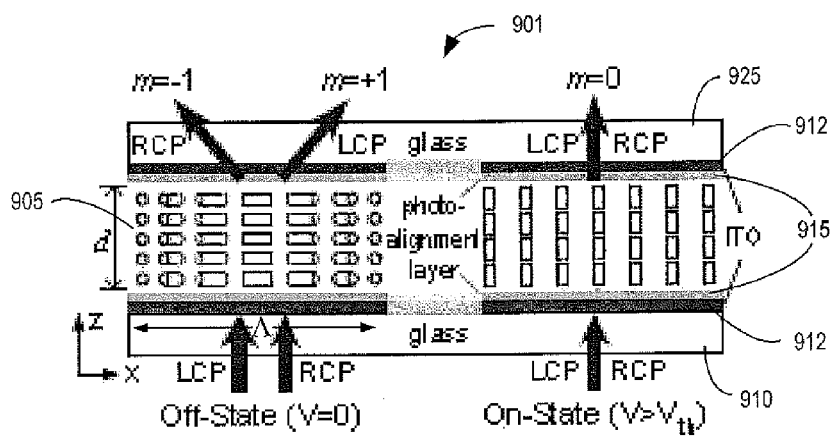
FIGURE 9B

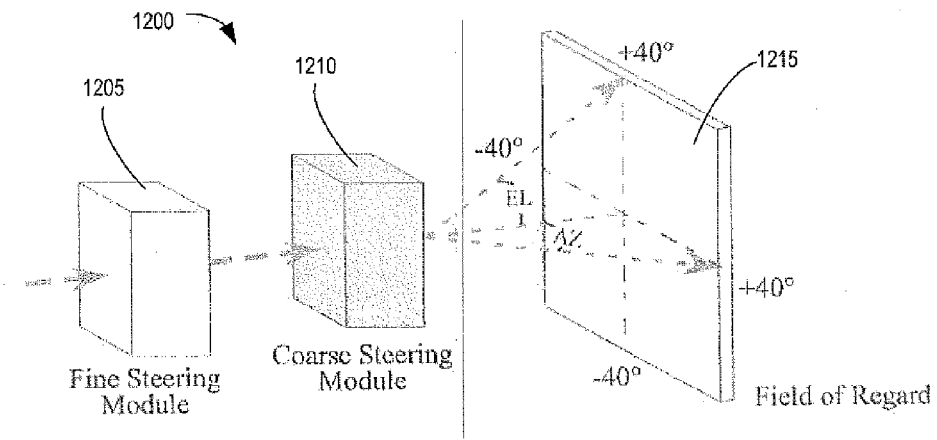
FIGURE 12
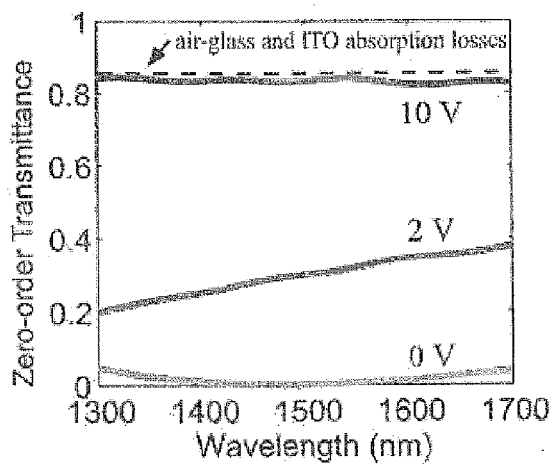
FIGURE 14A
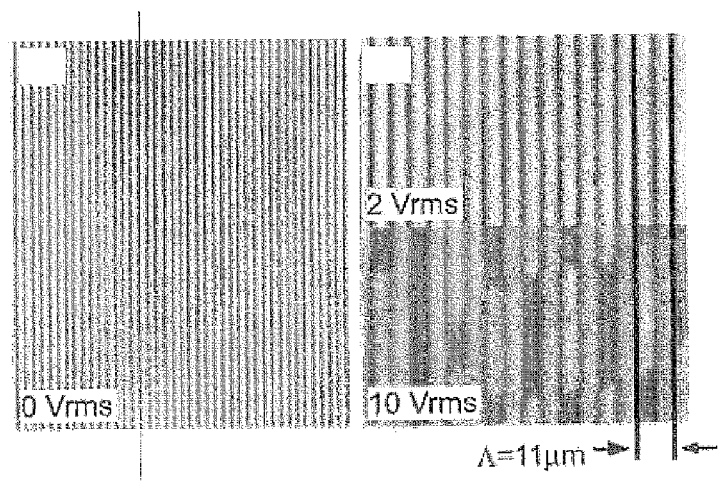
FIGURE 14B   FIGURE 14C

◯ = Right Handed Circular Polarization (RCP), ◐ = Left Handed Circular Polarization (LCP)

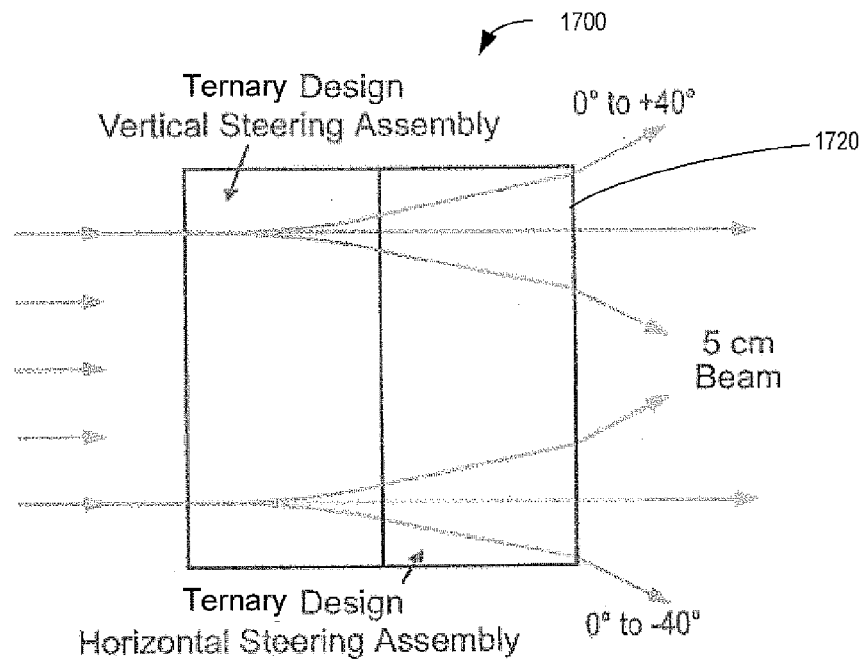
FIGURE 17A
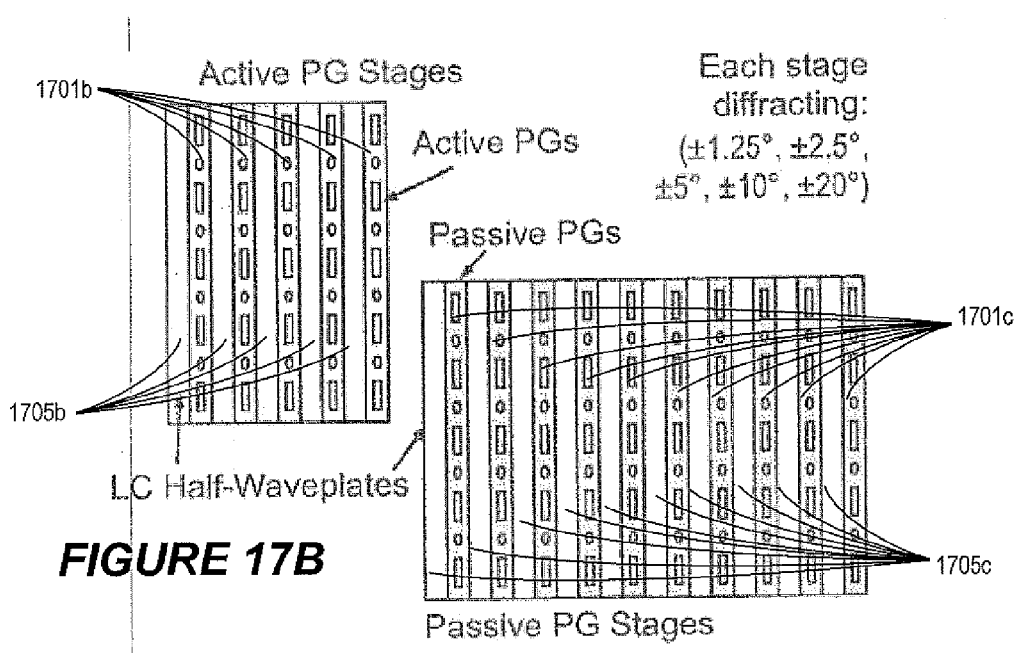
FIGURE 17B
FIGURE 17C

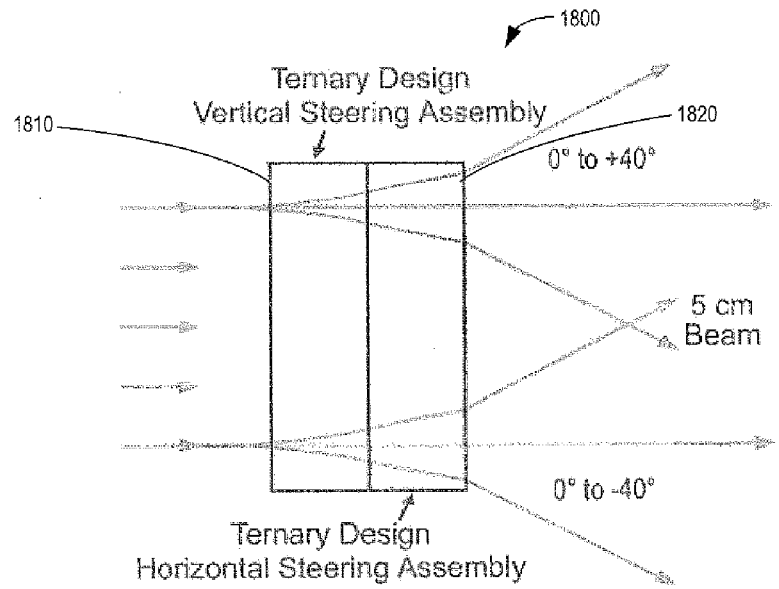
FIGURE 18A
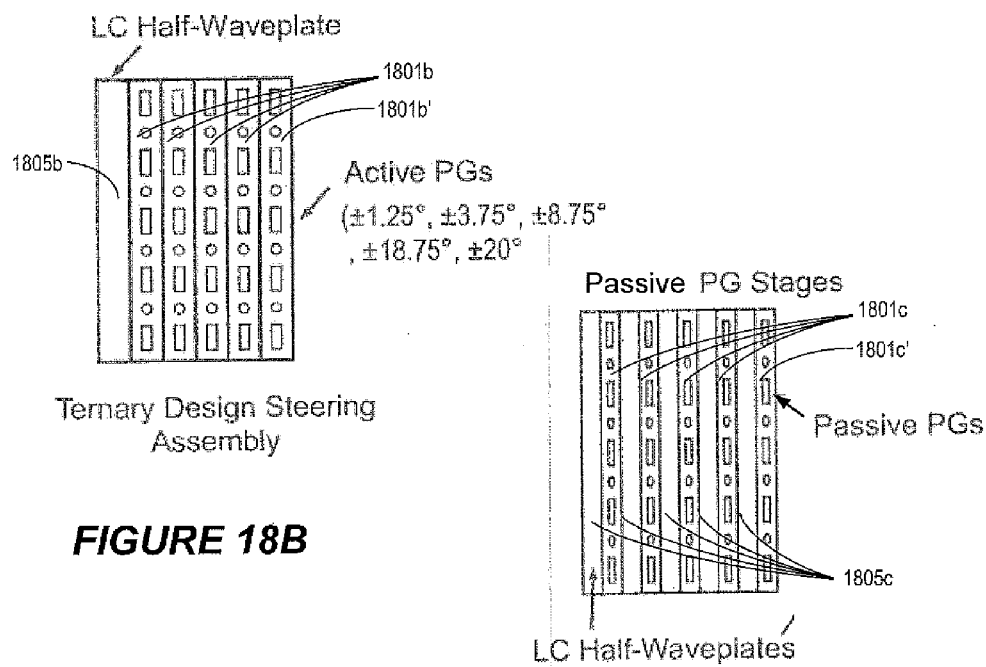
FIGURE 18B
FIGURE 18C

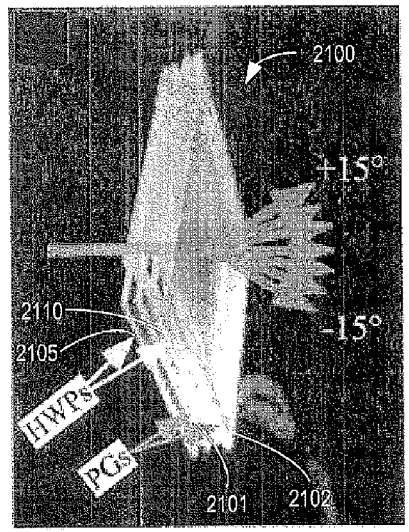 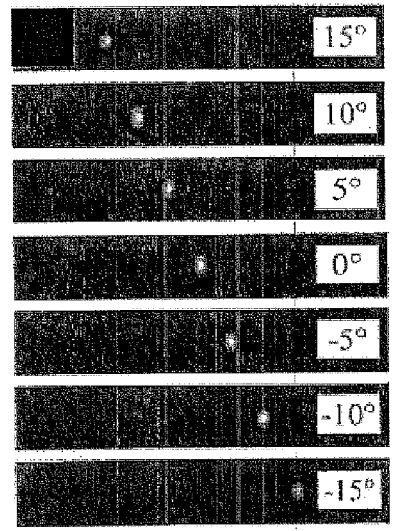
FIGURE 21A　　　　FIGURE 21B
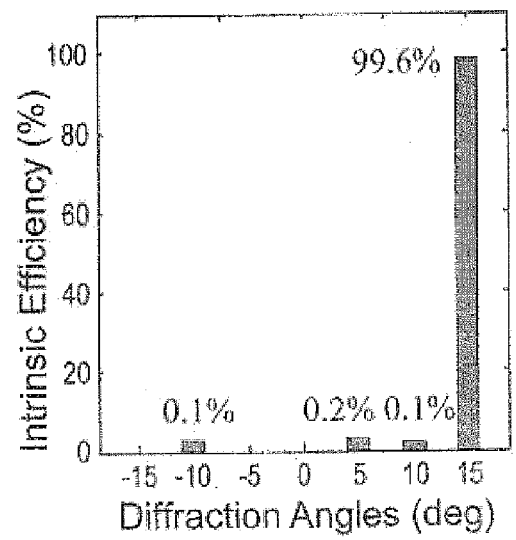
FIGURE 21C

US 8,982,313 B2

BEAM STEERING DEVICES INCLUDING STACKED LIQUID CRYSTAL POLARIZATION GRATINGS AND RELATED METHODS OF OPERATION

CLAIM OF PRIORITY

The present application is a 35 U.S.C. §371 national phase application of PCT International Application No. PCT/US2010/043861, entitled "Beam Steering Devices Including Stacked Liquid Crystal Polarization Gratings And Related Methods Of Operation", having an international filing date of Jul. 30, 2010, which claims priority to U.S. Provisional Patent Application No. 61/230,227, entitled "Beam Steering Devices Including Stacked Liquid Crystal Polarization Gratings And Related Methods Of Operation", filed Jul. 31, 2009, the disclosures of which are hereby incorporated herein by reference as set forth in their entireties. The above PCT International Application was published in the English language and has International Publication No. WO 2011/014743A2.

FIELD OF THE INVENTION

The present invention relates to beam steering, and more particularly, to beam steering using polarization gratings and related methods of operation.

BACKGROUND OF THE INVENTION

Point-to-point steering of electromagnetic radiation may be used in many applications, often in such a fashion that may require adjustment over time. For example, the ability to provide precise beam pointing may be important in systems where beam alignment and target tracking are required (usually optical, at least partially collimated), such as free-space optical communications (e.g., "laser comm," such as ship-to-ship, ground-to-air, etc.), countermeasures, directed energy weapons (e.g., "laser cannons"), and/or fiber optic switching devices (such as routers). Such electro-optical systems may benefit from point-to-point steering with rapid pointing ability, compact size, and/or light weight.

With increasing demands for compact, robust, and/or cost-effective devices for beam steering, Risley Prisms (typically made up of pairs of wedge prisms) have been used for their high degree of accuracy and stability. Their utility, however, may be limited by relatively small deflection angles and/or poor size scaling properties (for example, due to bulky prismatic elements) where wide angles and modest/large apertures are required. Other mechanical methods to steer the light, such as tilting a mirror or gimbal mount, may also present difficulties for many applications due to their size, weight, and/or speed. Non-mechanical (inertialess) beam steering options may also be possible, such as optical-phased-arrays formed by LC spatial-light-modulators or electrowetting devices, switchable volume holograms, blazed gratings, birefringent prisms, microlens (lenslet) arrays, and Micro-Electro-Mechanical Systems (MEMs) mirrors. However, many of these applications may be limited by relatively low throughput, high absorption/loss/scattering, small steering range/resolution/aperture, and/or large physical size/weight.

SUMMARY OF THE INVENTION

According to some embodiments of the present invention, a beam steering apparatus includes a first beam steering stage and a second beam steering stage in-line with the first beam steering stage. The first beam steering stage includes a first polarization grating having a first periodic uniaxial birefringence pattern. The second beam steering stage includes a second polarization grating having a second periodic uniaxial birefringence pattern. At least one of the first polarization grating and the second polarization grating is operable to be independently rotated about an azimuth angle.

In some embodiments, a circularly polarized input beam may be provided incident on the first polarization grating.

In some embodiments, each of the first and second polarization gratings may be independently rotated about a common axis.

In some embodiments, the first polarization grating may be a polymerized liquid crystal layer including a first periodic director pattern, and the second polarization grating may be a polymerized liquid crystal layer including a second periodic director pattern. For example, the polymerized liquid crystal layers may be reactive mesogen layers.

In some embodiments, the respective birefringence patterns of the first and second polarization gratings may have a same or different periodicity.

In some embodiments, at least one of the first and second polarization gratings may be a switchable liquid crystal layer that is configured to be switched between a first state that does not substantially affect the polarization of the light traveling therethrough and a second state that alters the polarization of the light traveling therethrough.

In some embodiments, at least one polarization selector may be provided before, after, and/or between the first and second polarization gratings. The polarization selector may be configured to alter the polarization state of light that passes therethrough, and may be switchable in some embodiments. For example, the polarization selector may be arranged before the first polarization grating to provide the circularly polarized input beam incident thereon.

According to further embodiments of the present invention, a beam steering apparatus includes a first beam steering stage and a second beam steering stage arranged to receive the first beam from the first beam steering stage. The first beam steering stage includes a first polarization grating configured to polarize and redirect a polarized input beam incident thereon to output a first beam having a first propagation angle. The second beam steering stage includes a second polarization grating configured to analyze and redirect the first beam incident thereon to output a second beam having a second propagation angle. At least one of the first polarization grating and the second polarization grating is operable to be independently rotated about an axis to rotate a propagation direction of a corresponding one of the first beam and the second beam.

In some embodiments, rotation of the one of the first polarization grating and the second polarization grating about the axis may rotate the propagation direction of the corresponding one of the first beam and the second beam without substantially altering a corresponding one of the first propagation angle and the second propagation angle relative to a surface of the one of the first and second polarization gratings.

In some embodiments, the first polarization grating and the second polarization grating may respectively include a uniaxial birefringence pattern having a director orientation that varies in a periodic manner.

In some embodiments, the input beam and the first beam may have respective polarizations comprising one of a first polarization state and a second polarization state. The second polarization state may be orthogonal to the first polarization state. The first polarization grating and the second polarization grating may be configured to redirect the input beam and the first beam, respectively, into one of two different propagation directions depending on the respective polarizations thereof to provide the first beam and the second beam, respectively.

In some embodiments, the first polarization state may be left-handed circular polarization, and the second polarization state may be right-handed circular polarization. The first polarization grating and the second polarization grating may be configured to redirect the input beam and the first beam, respectively, into one of the two propagation directions depending on a handedness of the respective polarizations thereof. The first polarization grating and the second polarization grating may be further configured to switch the respective polarizations of the input beam and the first beam, respectively, between the first and second polarization states to provide the first beam and the second beam, respectively.

In some embodiments, the axis may be a common axis for the first and second polarization gratings, and each of the first and second polarization gratings may be operable to be independently rotated about the common axis.

In some embodiments, the first and second polarization gratings may respectively include a polymerized liquid crystal layer. For example, the polymerized liquid crystal layer may be a reactive mesogen layer.

In some embodiments, at least one of the first and second polarization gratings may be a switchable liquid crystal layer that is operable to be switched between a first state that does not substantially affect the polarization and the propagation angle of a corresponding one of the input beam and the first beam and a second state that alters the polarization and the propagation angle of the corresponding one of the input beam and the first beam.

In some embodiments, the apparatus may further include a third beam steering stage arranged to receive the second beam from the second beam steering stage. The third beam steering stage may include a third polarization grating configured to analyze and redirect the second beam incident thereon to output a third beam having a third propagation angle. The third polarization grating may be operable to be rotated about the axis independently of the first and/or second polarization gratings to rotate a propagation direction of the third beam without substantially altering the third propagation angle relative to a surface of the third polarization grating.

In some embodiments, the periodic birefringence pattern of the first polarization grating has a first grating period, and the periodic birefringence pattern of the second polarization grating has a second grating period different than the first grating period. The first grating period may be greater than the second grating period, and the first propagation angle may be less than the second propagation angle. In some embodiments, the second propagation angle may be about twice the first propagation angle.

In some embodiments, at least one of the first and second beam steering stages may furthering include a polarization selector arranged to output circularly-polarized light as one of the input beam and the first beam to a corresponding one of the first polarization grating and the second polarization grating, respectively. In particular, the first beam steering stage may further include a first polarization selector configured to receive input light and provide circularly polarized light as the input beam to the first polarization grating. Also, the second beam steering stage may further include a second polarization selector arranged to receive the first beam from the first beam steering stage. The second polarization selector may be configured to alter the polarization state of the first beam between one of the first and second polarization states without substantially altering the propagation angle thereof, and may provide the first beam having the altered polarization state to the second polarization grating.

In some embodiments, the polarization selector may be a switchable liquid crystal layer that is operable to be switched between a first state that does not substantially affect the polarization state of light traveling therethrough and a second state that alters the polarization state of light traveling therethrough.

According to still further embodiments of the present invention, a beam steering apparatus includes a first beam steering stage and a second beam steering stage stacked on the first beam steering stage. The first beam steering stage includes a first polarization grating having a first periodic uniaxial birefringence pattern, and a polarization selector stacked thereon that is configured to provide a polarized input beam incident on the first polarization grating. The second beam steering stage includes a second polarization grating having a second periodic uniaxial birefringence pattern.

In some embodiments, the input beam may be circularly polarized.

In some embodiments, the first polarization grating may be a polymerized liquid crystal layer including a first periodic director pattern, and the second polarization grating may be a polymerized liquid crystal layer including a second periodic director pattern. For example, the polymerized liquid crystal layers may be reactive mesogen layers.

In some embodiments, the respective periodic birefringence patterns of the first and second polarization gratings may have a same or different periodicity.

In some embodiments, the periodic birefringence pattern of the second polarization grating may be globally rotated relative to that of the first polarization grating.

In some embodiments, at least one of the first and second polarization gratings may be a switchable liquid crystal layer that is configured to be switched between a first state that does not substantially affect the polarization of the light traveling therethrough and a second state that alters the polarization of the light traveling therethrough between left-handed or right-handed circular polarization.

In some embodiments, the second beam steering stage may include a waveplate configured to alter a handedness of the first beam between left-handed or right-handed circular polarization, and to provide the first beam having the altered handedness to the second polarization grating. The waveplate and/or the polarization selector may be switchable in some embodiments.

According to yet further embodiments of the present invention, a beam steering apparatus includes a first beam steering stage and a second beam steering stage arranged to receive the first beam from the first beam steering stage. The first beam steering stage includes a first polarization grating and a first polarization selector configured to provide a polarized input beam incident on the first polarization grating. The first polarization grating is configured to alter a polarization of the input beam and alter a propagation angle thereof by a first angle to output a first beam. The second beam steering stage includes a second polarization grating configured to alter a polarization of the first beam and alter a propagation angle thereof by a second angle to output a second beam.

In some embodiments, the input beam and the first beam may have respective polarizations comprising one of a first polarization state and a second polarization state. The second polarization state may be orthogonal to the first polarization state. The first polarization grating and the second polarization grating may be configured to redirect the input beam and the first beam, respectively, into one of two different propagation directions depending on the respective polarizations thereof to output the first beam and the second beam, respectively. The first polarization grating and the second polarization grating may be further configured to switch the respective polarizations of the input beam and the first beam, respectively, between the first and second polarization states to output the first beam and the second beam, respectively.

In some embodiments, the first polarization state may be left-handed circular polarization, and the second polarization state may be right-handed circular polarization. The first polarization grating may be configured to additively or subtractively alter the propagation angle of the input beam by the first angle depending on a handedness of the polarization thereof to output the first beam in one of the two propagation directions. The second polarization grating may be configured to additively or subtractively alter the propagation angle of the first beam by the second angle depending on a handedness of the polarization thereof to output the second beam in one of the two propagation directions.

In some embodiments, the first polarization grating and the second polarization grating may respectively include a uniaxial birefringence pattern having a director orientation that varies in a periodic manner.

In some embodiments, at least one of the first polarization grating and the second polarization grating may be a switchable liquid crystal layer that is operable to be switched between a first state that does not substantially affect the polarization and the propagation angle of a corresponding one of the input beam and the first beam, and a second state that alters the polarization and the propagation angle of the corresponding one of the input beam and the first beam.

In some embodiments, the second stage may further include a second polarization selector arranged to receive the first beam and configured to alter the polarization of the first beam between the first and second polarization states without substantially altering the propagation angle thereof and to provide the first beam having the altered polarization to the second polarization grating.

In some embodiments, the second polarization selector may be a birefringent plate. In some embodiments, at least one of the first and second polarization selectors may be a switchable liquid crystal layer that is operable to be switched between a first state that does not substantially affect the polarization of light traveling therethrough and a second state that alters the polarization of light traveling therethrough. In some embodiments, the first and second polarization selectors may each be a switchable liquid crystal layer, such that the polarization states of the input beam and the first beam, respectively, may be independently controllable prior to providing the input beam and the first beam to the first polarization grating and the second polarization grating, respectively.

In some embodiments, the first and second polarization gratings may respectively include a polymerized liquid crystal layer. For example, the polymerized liquid crystal layer may be a reactive mesogen layer.

In some embodiments, the apparatus may further include a third beam steering stage arranged to receive the second beam from the second beam steering stage. The third beam steering stage may include a third polarization grating configured to alter a polarization of the second beam and configured to additively or subtractively alter a propagation angle of the second beam by a third angle depending on a handedness of the polarization thereof to output a third beam in one of the two propagation directions.

In some embodiments, the periodic birefringence pattern of the second polarization grating may be globally rotated relative to the periodic birefringence pattern of the first polarization grating. The first polarization grating may be configured to alter the propagation angle of the input beam by the first angle in a first dimension to output the first beam, while the second polarization grating may be configured to alter the propagation angle of the first beam by the second angle in a second dimension different than the first dimension to output the second beam.

In some embodiments, the periodic birefringence pattern of the first polarization grating may have a first grating period, and the periodic birefringence pattern of the second polarization grating may have a second grating period different than the first grating period. For example, the first grating period may be greater than the second grating period, and the first angle may be less than the second angle.

Other methods and/or devices according to some embodiments will become apparent to one with skill in the art upon review of the following drawings and detailed description. It is intended that all such additional devices, in addition to any and all combinations of the above embodiments, be included within this description, be within the scope of the invention, and be protected by the accompanying claims.

BRIEF DESCRIPTION OF THE DRAWINGS

FIGS. 3A and 3B illustrate vector representations of PG diffraction according to some embodiments of the present invention.

FIGS. 4A and 4B show images of a beam steered using mechanical beam steering according to some embodiments of the present invention as directed onto a planar screen.

FIGS. 6A-6B are cross-sectional views illustrating an active PG arrangement for a quasi-ternary nonmechanical beam steering apparatus in accordance with some embodiments of the present invention.

FIGS. 7A-7B are cross-sectional views illustrating an active PG arrangement for a full-ternary nonmechanical beam steering apparatus in accordance with some embodiments of the present invention.

FIG. 5A is a cross-sectional view illustrating a passive PG arrangement for a quasi-ternary nonmechanical beam steering apparatus in accordance with some embodiments of the present invention.

FIG. 5B is a cross-sectional view illustrating a passive PG arrangement for a full-ternary nonmechanical beam steering apparatus in accordance with some embodiments of the present invention.

FIG. 9A is a plan view illustrating a PG in accordance with some embodiments of the present invention in the off-state.

FIG. 9B is a cross-sectional view illustrating the orientation of LC molecules in a PG according to some embodiments of the present invention in both the off-state (left side) and in the on-state (right side).

FIG. 12 is a perspective view illustrating a nonmechanical beam steering system in accordance with some embodiments of the present invention including fine and coarse steering modules.

FIG. 14A is a graph illustrating the spectral response of the zero-order transmission for LCPGs in accordance with some embodiments of the present invention for different values of applied voltage.

FIGS. 14B and 14C are polarizing optical microscope images of LCPGs in accordance with some embodiments of the present invention with different applied voltages.

FIGS. 17A-17C illustrate a coarse beam steering device in accordance with some embodiments of the present invention.

FIG. 18A-18C illustrate a coarse beam steering device in accordance with further embodiments of the present invention.

FIG. 21A is a photograph of a multi-stage nonmechanical beam steerer in accordance with some embodiments of the present invention.

FIG. 21B is a photograph showing the diffracted beams from the multi-stage nonmechanical beam steerer of FIG. 21A.

FIG. 21C is a graph of the intrinsic efficiency at different diffract angles for nonmechanical beam steering devices in accordance with some embodiments of the present invention.

DETAILED DESCRIPTION OF EMBODIMENTS OF THE INVENTION

Figure 1A:
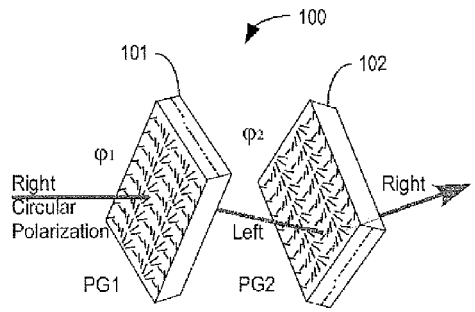
FIGS. 1A and 1B are perspective views illustrating mechanical beam steering embodiments of the present invention including two or more stacked and independently rotatable polarization gratings (PGs).

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Embodiments of the present invention are described herein with reference to liquid crystal (LC) materials and polarization gratings (PGs) incorporating LC materials. As used herein, the liquid crystals can have a nematic phase, a chiral nematic phase, a smectic phase, a ferroelectric phase, and/or another phase. In addition, a number of photopolymerizable polymers may be used as alignment layers to create the polarization gratings described herein. In addition to being photopolymerizable, these materials may be inert with respect to the LC, should provide stable alignment over a range of operating temperatures of the LC device (e.g., from about −50° C. to about 100° C.), and should be compatible with manufacturing methods described herein. Some examples of photopolymerizable polymers include polyimides (e.g., AL 1254 commercially available from JSR Micro, Inc (Sunnyvale, Calif.)), Nissan RN-1199 available from Brewer Science, Inc. (Rolla, Mo.), and cinnamates (e.g., polyvinyl 4-methoxy-cinnamate as described by M. Schadt et al., in "Surface-Induced Parallel Alignment of Liquid Crystals by Linearly Polymerized Photopolymers," Jpn. J. Appl. Phys., Vol. 31 (1992), pp. 2155-2164). Another example of a photopolymerizable polymer is Staralign™, commercially available from Vantico Inc. (Los Angeles, Calif.). Further examples include chalcone-epoxy materials, such as those disclosed by Dong Hoon Choi and co-workers in "Photoalignment of Low-molecular Mass Nematic Liquid Crystals on Photochemically Bifunctional Chalcone-epoxy Film by Irradiation of a Linearly Polarized UV," Bull. Korean Chem. Soc., Vol. 23, No. 4 587 (2002), and coumarin side chain polyimides, such as those disclosed by M. Ree and co-workers in "Alignment behavior of liquid-crystals on thin films of photosensitive polymers—Effects of photoreactive group and UV-exposure," Synth. Met., Vol. 117(1-3), pp. 273-5 (2001) (with these materials, the LC aligns nearly perpendicularly to the direction of polarization). Additional examples of methods of liquid crystal alignment are also discussed in and U.S. Pat. No. 7,196,758 to Crawford et al. Furthermore, some structures described herein may involve precise fabrication through a balance of spin-coating processes and liquid crystal materials. Additional structures and/or methods for use with some embodiments of the present invention are discussed in PCT Publication Nos. WO 2006/092758, WO 2008/130559, WO 2008/130561, and WO 2008/130555 to Escuti, et al., as well as pending PCT Application No. PCT/US2008/011611 to Escuti, et al., the disclosures of which are incorporated by reference herein in their entireties.

It will be understood by those having skill in the art that, as used herein, "polymerizable liquid crystals" may refer to relatively low-molecular weight liquid crystal materials that can be polymerized. In contrast, "non-reactive liquid crystals" may refer to relatively low-molecular weight liquid crystal materials that may not be polymerized. Also, as used herein, "zero-order" light propagates in a direction substantially parallel to that of the incident light, i.e., at a substantially similar angle of incidence, and may be referred to herein as "on-axis" light. For example, in several of the embodiments described in detail below, the incident light is normal to the first polarization grating; thus, "zero-order" or "on-axis" light would also propagate substantially normal to the first polarization grating in these embodiments. In contrast, "non-zero-order light", such as "first-order" light, propagates in directions that are not parallel to the incident light, and is referred to herein as "off-axis" light.

Polarization gratings according to some embodiments of the present invention may be transparent, thin-film, beamsplitters that periodically alter the local polarization state and propagation direction of light traveling therethrough. In contrast, conventional linear polarizers may operate by converting incident light into a single polarization state, permitting light of that polarization state to travel therethrough, but absorbing light of other polarization states. Some embodiments of the present invention provide polarization grating arrangements including at least first and second polarization gratings. In such an arrangement, the second polarization grating is generally referred to herein as an "analyzer", and thus, "analyzes" (i.e., polarizes) the polarized light received from the first polarization grating and/or intermediate layers. One or more of the PGs may be provided by a liquid crystal layer that is configured to be switched between a first state that does not substantially affect the polarization of light traveling therethrough, and a second state that "reverses" the polarization of the light traveling therethrough (i.e., converts the light to its opposite or orthogonal polarization). For example, the liquid crystal layer may be a switchable birefringent liquid crystal layer that can be electrically switched between zero and half-wave retardation responsive to a voltage applied thereto, with relatively high accuracy and relatively wide bandwidth. Additionally or alternatively, one or more of the polarization gratings may be a polymerized liquid crystal layer. Polarization gratings according to some embodiments of the present invention may have a spatially-variant uniaxial birefringence (i.e., $n(x)=[\cos(\pi x/\Lambda), \sin(\pi x/\Lambda), 0]$), and may provide diffraction efficiencies of up to 100%.

Some embodiments of the present invention provide devices that can steer (control) the direction of light passing therethrough. The devices may include at least two stacked polarization gratings and other elements that provide a beam steering assembly with good optical efficiency and size. Embodiments of the present invention are described below with reference to (1) non-mechanical designs with discrete steering, and (2) mechanical designs with continuous steering, both of which operate according to similar optical principles. While some embodiments may be described herein as acting on narrowband input light (for example, from a monochromatic laser), it is to be understood wideband input light may be used in a similar fashion. Likewise, while described herein specifically with reference to visible and infrared light, all electromagnetic radiation may be used. Some advantages of embodiments of the present invention as compared to existing technologies include higher throughput (lower loss), more compact physical size, and lower potential cost. Embodiments of the present invention may be used, for example, in laser communications, laser radar, laser weapons, active projected illumination (displays et al.), remote sensing, and/or photonic switching.

Beam steering devices according to embodiments of the present invention employ configurations of thin optical elements, which are configured to steer light into a wide field-of-regard with high efficiency. In particular, beam steering devices according to embodiments of the present invention include at least two stacked liquid crystal polarization gratings, each of which has three individual steering states. The polarization gratings are polarization-sensitive diffractive elements with relatively wide acceptance angles and relatively low loss. In some embodiments, non-mechanical discrete beam steering may be accomplished using stacked liquid crystal elements (waveplates and polarization gratings). In additional embodiments, mechanical continuous beam steering may be accomplished by the rotation of two or more polarization gratings around a common axis. Accordingly, beam steering devices according to embodiments of the present invention can efficiently steer light into a wide field-of-regard with very low sidelobes, as well as provide large beam diameters and a relatively thin assembly (leading to depth/diameter aspect ratios much smaller than 1). In the nonmechanical embodiments, further advantages include a number of possible (discrete) steering angles that scale exponentially (for example, $3^N$ or $2^{(N+1)}-1$, where N is the number of PGs). In the mechanical embodiments, further advantages include relatively low beam walk-off and low-inertia elements that enable relatively fast steering.

Figure 1B:
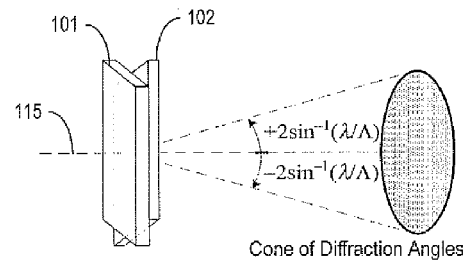

Mechanical beam steering embodiments of the present invention may include two or more stacked polarization gratings (PGs), each of which may be independently rotated about its azimuth, as illustrated in FIGS. 1A-1B, to provide continuous beam steering with circularly polarized input light. Such independently rotating, in-line polarization gratings may be rotated by known mechanical means, and are also referred to herein as "Risley Gratings." Some embodiments of the present invention may achieve high steering throughput within a large field-of-regard (FOR), in a manner similar to Risley Prisms (typically a pair of wedged prisms). However, because the PGs are patterned in thin liquid crystal layers (e.g., a few μm thick) and are scalable to large areas (e.g., many cm²) without increasing their thickness, they enable a systems with less thickness, weight, and beam walk-off, as well as improved aspect ratio. Furthermore, large apertures are feasible and any wavelength from visible to midwave-infrared or greater can be chosen. Any direction within a solid angle defined by approximately twice the diffraction angle of each PG can be addressed mechanically. In some embodiments, a Risley Grating system including two PGs with a grating period of about 6 μm provides a FOR of about 62° and a transmittance of about 89% to about 92% or more at a wavelength of about 1550 nm.

In particular, as shown in FIG. 1A, a mechanical beam steering apparatus 100 includes a first beam steering stage including a first PG 101 and a second beam steering stage including a second PG 102 arranged in-line. In some embodiments, each PG 101 and 102 may be a polymerized liquid crystal PG with the same grating period $\Lambda$, and each PG 101 and 102 may be individually rotated around a common axis 115 with respective (azimuth) orientation angles $\phi_1$ and $\phi_2$ from 0° to 360°, with respect to some reference. Beam steering is accomplished as follows: (1) normally incident polarized light is diffracted by the first PG 101 into a particular propagation direction and angle, depending on its grating period $\Lambda$ and orientation angle (the polarization state of the incident light is also reversed); and (2) the second PG 102 redirects this light into its final propagation direction and angle for output, depending on its $\Lambda$ and orientation angle. As shown in FIG. 1B, the result is that all propagation angles within a cone 130 having a half-angle $\theta_{max}=2\sin^{-1}(\lambda/\Lambda)$ may be addressed in a continuous (not discrete) fashion by the choice of the two grating orientation angles ($\phi_1$ and $\phi_2$). For example, two PGs with a grating period of about 6 μm may steer anywhere within a solid angle within an approximately ±30° field-of-view. The configuration illustrated in FIGS. 1A and 1B may be further modified to enable faster steering speed and/or modification of the on-axis singularity. For example, more than two PGs may be used; one or more of the polymerizable PGs described above may be replaced with switchable PGs; and/or polarization selector(s) may be placed before or after any of the PGs.

Figure 2A:
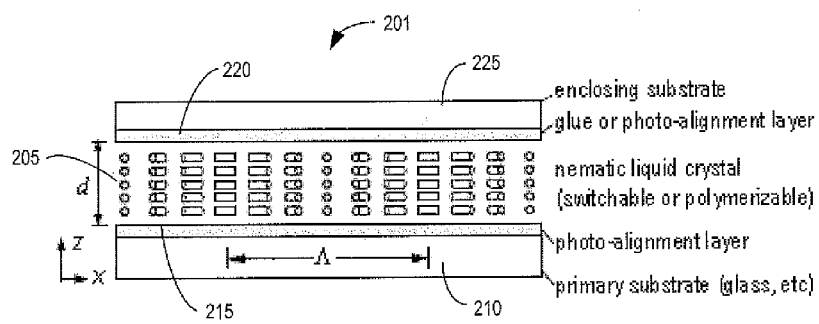
FIG. 2A is a cross-sectional view illustrating a PG that may be used to provide one of the independently rotating, in-line polarization gratings of FIGS. 1A and 1B.
Figure 2B:
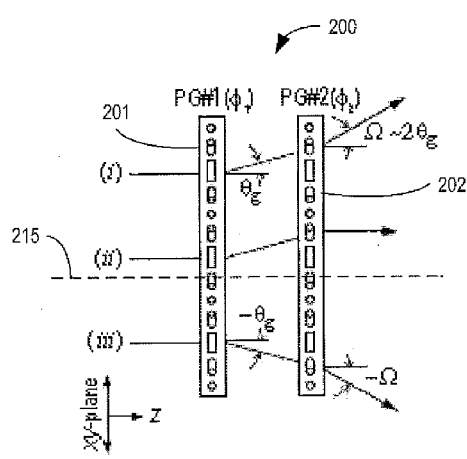
FIG. 2B is a cross-sectional view of a mechanical beam steering device in accordance with some embodiments of the present invention.
Figure 2C:
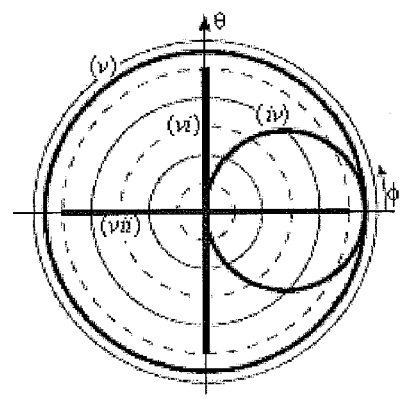
FIG. 2C illustrates sample scanning patterns of mechanical beam steering devices according to some embodiments of the present invention.

FIGS. 2A-2C illustrate continuous beam steering using rotating polarization gratings (PGs). In particular, FIG. 2A illustrates a PG 201, also referred to herein as a Risley Grating, which may be used to provide one of the independently rotating, inline polarization gratings of FIGS. 1A and 1B to achieve an efficient and compact beam steering device. The PG 201 includes a primary substrate 210 (for example, a glass substrate); a photo-alignment layer 215 including a periodic alignment condition therein; a nematic liquid crystal layer 205 (which may be switchable or polymerizable); an adhesive layer (or an additional photo-alignment layer) 220; and an enclosing substrate 225 (which may also be a glass substrate). FIG. 2B illustrates a cross-sectional view of a beam steering device 200 using two in-line PGs 201 and 202, such as the device 100 of FIG. 1A, while FIG. 2C illustrates sample scanning patterns of Risley gratings according to some embodiments of the present invention. The single-order diffraction, high efficiency, polarization behavior, and wide acceptance angle of the Risley gratings according to some embodiments of the present invention as described herein provide for beam steering with high throughput and low sidelobes. While several other liquid crystal (LC) grating structures (for example, blazed or binary types) may be used as beam steering elements, Risley gratings according to some embodiments may provide improved angle performance, peak efficiency, and/or transmittance. Risley gratings according to some embodiments of the present invention further provide little to no beam walk-off, and can be tailored to operate at nearly any wavelength from visible to midwave-infrared. In particular embodiments as described herein, a Risley grating can perform continuous steering of a laser beam (having a wavelength about 1550 nm) with the maximum deflection angle of about ±31° and up to about 92% throughput. The angle of the emerging beam from the Risley grating was calculated using the direction cosine space method and confirmed by experimental results. The steering patterns and sidelobes are also discussed in greater detail below.

In general, PGs are diffractive elements composed of periodic profiles of spatially varying optical anisotropy, for example, as provided by a birefringent liquid crystal material including a periodic director pattern. In some embodiments of the invention, "circular"-type PGs 201 and 202 are used, which are defined by a spiraling, constant magnitude, uniaxial birefringence, as shown in FIG. 2A. In particular, the PGs 201 and 202 respectively include a uniaxial birefringence pattern having a director orientation that varies in a periodic manner, also referred to herein as a periodic uniaxial birefringence pattern. Such PGs 201 and 202 exhibit properties of both the thin (Raman-Nath) and thick (Bragg) grating regimes, including up to about 100% theoretical efficiency into a single diffraction order and a wide angular acceptance angle. Where the parameter $\rho = 2\lambda 2 = \underline{n}\Delta n \Lambda 2 << 1$, the first-order diffraction efficiency can be accurately approximated as follows:

$$\eta \pm 1 = \frac{1 \mp S'_3}{2} \cos^2\left(\frac{\pi \Delta nd}{\lambda}\right) \quad (1)$$

where $\Delta n$ is the birefringence, $\underline{n}$ is the average index, d is the grating thickness, $\Lambda$ is the grating period, $\lambda$ is the wavelength, and $S'_3 = S_3/S_0$ is the normalized Stokes parameter describing polarization ellipticity of the incident light. As used herein, the subscript "±" notation denotes +1 or −1 diffraction-order. Note that a single first-order efficiency can indeed be 100% when $\Delta nd = \lambda/2$ and when circularly polarized light (i.e., $S'_3 = \pm 1$) is incident, as illustrated in FIG. 2B. First-order diffracted light will have the reverse handedness of the input, and is circularly polarized regardless of the input. Also, efficiency does not depend on either $\Lambda$ or the angle of incidence $\theta_{in}$, enabling design flexibility as compared to Bragg gratings (another high efficiency grating). The propagation angle $\theta \pm 1$ of light transmitted into the first-orders is determined by the grating equation: $\sin \theta \pm 1 = \pm \lambda/\Lambda + \sin \theta in$ (when the incident light is coplanar with the grating vector). Over the last few years, high quality PGs with nearly 100% diffraction efficiency have been demonstrated using liquid crystal (LC) and photo-alignment materials patterned by polarization holography, for example, as described in PCT Publication No. WO 2008/130559, the disclosure of which is incorporated by reference. Such gratings may employ highly cross-linked polymer films and/or electrically switchable cells, and may have grating periods of about 3 μm or less, for use in visible, near-infrared, and/or midwave-infrared applications.

As shown in FIG. 2A, PGs 201 and 202 according to some embodiments of the present invention can be formed as a thin liquid crystal layer on thin substrates (for example, glass or silicon) placed in close proximity (for example, to provide a total thickness of few millimeters), and can be made with wide areas (for example, several square centimeters). Such PGs 201 and 202 may exhibit an improvement in aspect ratio as compared to Risley Prisms.

FIG. 2B illustrates a compact beam steering device 200 using two independently rotating in-line PGs 201 and 202. In particular, FIG. 2B illustrates beam steering using two in-line PGs 201 and 202 rotatable around a common optical axis 215 with respective azimuth orientation angles $\{\phi_1, \phi_2\}$ for three cases (i), (ii), and (iii), where $\{\phi_1, \phi_2\}$ have values of (i) $\{0°, 180°\}$, (ii) $\{0°, 0°\}$, and (iii) $\{180°, 0°\}$. A principle of operation is described as follows. A circularly polarized, collimated, narrowband beam is arranged normally incident on the first PG 201. With up to 100% efficiency, this light is redirected into the polar angle $\theta_g = \sin^{-1}(\lambda/\Lambda)$ with an azimuthal direction set by the azimuth angle $\phi_1$ of this first PG. The second PG 202 then receives this beam, and redirects it again into the polar angle $\Omega$ with a nonlinear dependence on its diffraction angle $\theta_g$ and azimuth angle $\phi_2$. More particularly, as shown in FIG. 2B, $\sin \theta g = \lambda/\Lambda$ and $\sin \Omega = 2 \sin \theta g$. The angles $\theta$ and $\Omega$ are also referred to herein as propagation angles.

Since the angle relationship is nonlinear, it may be convenient to introduce the direction cosine space where diffraction at an arbitrary incident angle can be described by linear vector representations, as shown in FIGS. 3A and 3B. In particular, FIGS. 3A and 3B illustrate vector representations of the PG diffraction in the direction cosine space for the diffraction G1 provided by the first PG 201 and the diffraction G2 provided by the second PG 202, respectively. The final output direction can be expressed as a simple vector sum G=G1+G2. The direction cosines of the steered beam are given by:

$$\alpha = \sin \theta g(\cos \phi 1 - \cos \phi 2) \quad (2a)$$

$$\beta = \sin \theta g(\sin \phi 1 - \sin \phi 2) \quad (2b)$$

$$\gamma = \sqrt{(1 - \alpha^2 - \beta^2)} \quad (2c)$$

By definition, $\alpha^2 + \beta^2 \leq 1$. The net azimuth and polar angles of the transmitted beam can be determined from Eqs. 2 as:

$$\phi = \tan^{-1}(\beta/\alpha) \quad (3a)$$

$$\theta = \cos^{-1}(\gamma) \quad (3b)$$

The maximum steering or deflection angle is defined as $\sin \Omega = 2 \sin \theta g$, and the device can steer to angles within a±$\Omega$ cone (as shown in FIG. 2C), with a field-of-regard (FOR) of about 2$\Omega$. In particular, FIG. 2C illustrates continuous scanning patterns as the orientation angles $\{\phi_1, \phi_2\}$ of the two PGs are varied as (iv) $\{\phi, 0°\}$, (v) $\{\phi+180°, \phi\}$, (vi) $\{\phi-90°, -\phi+90°\}$, and (vii) $\{\phi, -\phi+180°\}$. Chromatic dispersion in such a two PG device may follow typical diffractive dispersion.

In accordance with the above embodiments, Risley grating beam steering with a deflection angle $\Omega = 31°$ (and thus, a 62° FOR) at 1550 nm was achieved using a pair of PGs, each with $\theta g = 15°$ ($\Lambda = 6$ μm) and 1-cm$^{-2}$ aperture. The two PGs 201 and 202 were mounted in separate rotation stages, manually controlled, to independently set their grating orientations. Defect-free PGs may be formed as LC cells, using polarization holography and photo-alignment materials. In the above embodiments, a linear-photopolymerizable polymer (LPP) (ROP-103/2CP, from Rolic) and nematic LC (LCMS-102, from Boulder Nonlinear Systems, $\Delta n = 0.31$ at 1550 nm) were used. After coating glass substrates with LPP (3000 krpm spin, 130° C. bake for 10 min), a cell with 2.5 thickness was formed (using silica spacers). The PG pattern was recorded with orthogonal, circularly polarized beams from a He—Cd laser (325 nm), with an exposure energy of 2 J/cm$^2$. The exposed cell was filled with LC in the isotropic state (at 150°

C.) at atmospheric pressure. The individual PGs 201 and 202 exhibited nearly ideal PG diffraction (as shown in Eq. 1) with greater than 98% first-order efficiency, and with no observable higher orders or scattering. Note that an LC with high birefringence may be used to achieve low-leakage and low-scattering PGs with a large diffraction angle. Both air/glass interfaces on each PG 201 and 202 in FIG. 2B were treated with anti-reflection coatings to reduce reflection losses.

FIGS. 4A and 4B illustrate Risley grating beam steering with a field-of-regard (FOR) of about 62° using input light having a wavelength of about 1550 nm. The pictures of the steered beam on an IR sensitive detecting screen were taken and post-processed onto the angle space. FIGS. 4A and 4B show images of the steered beam (from a linearly polarized IR laser passed through a quarter-waveplate) directed onto a planar screen, showing a variety of simple scans (lines and circles) within the entire field-of-regard (FOR). These correspond to the curves indicated in FIG. 2C, validating Eqs. 3. Each image illustrated in FIGS. 4A and 4B includes a superposition of individual pictures taken of the beam incident on a fluorescent infrared viewing-card in a dark room.

Figure 5A:
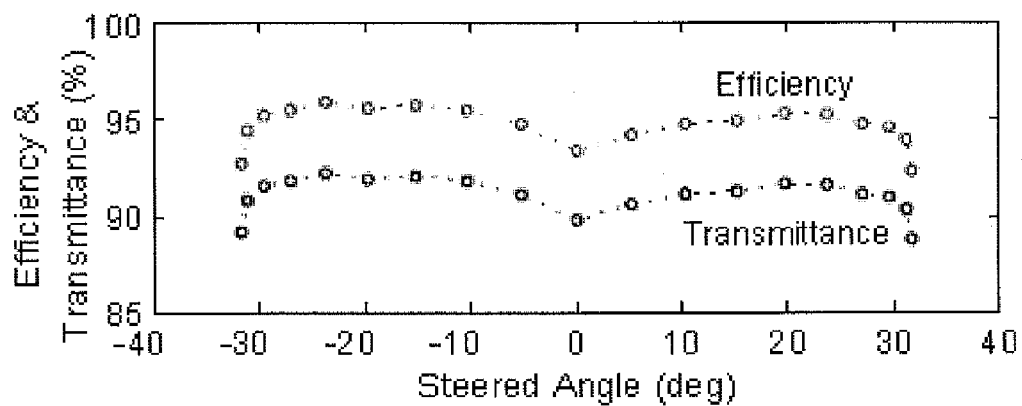
FIG. 5A is a graph illustrating transmittance and efficiency of a beam steered using mechanical beam steering according to some embodiments of the present invention for different steered angles.
Figure 5B:
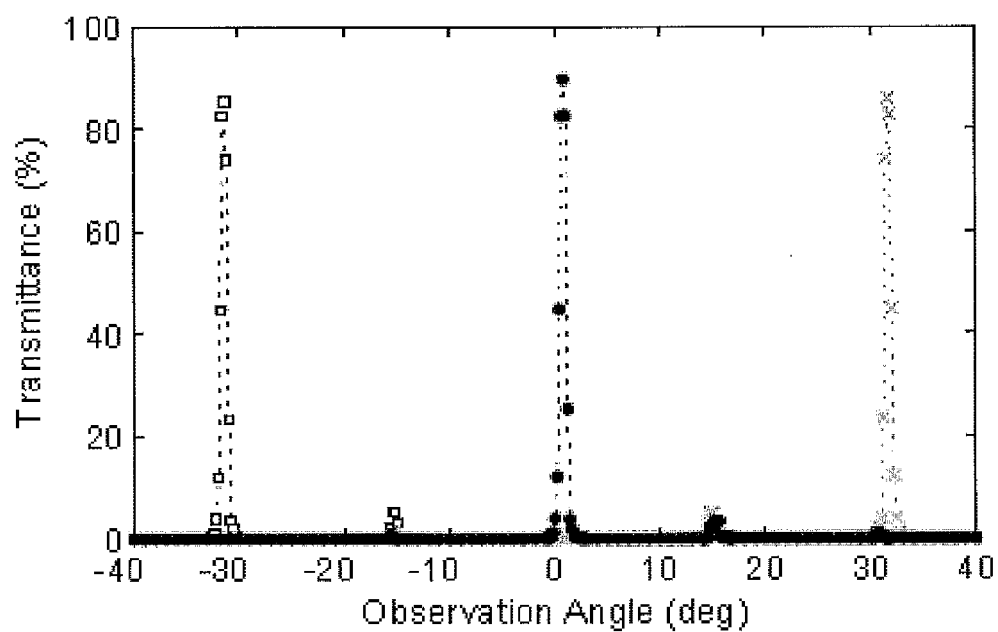
FIG. 5B illustrates transmittance of a beam steered using mechanical beam steering according to some embodiments of the present invention for different observation and steering angles.

As illustrated in FIGS. 5A and 5B, continuous beam steering was confirmed within about ±31° with approximately 92% throughput (i.e., transmittance). As used herein, the "transmittance" of a grating arrangement may refer the intensity of the output light divided by the intensity of the input light, and thus, includes the effects of the grating layer plus all other layers or substrates. In other words, the transmittance T may be defined as $T=P_{out}/P_{in}$, where $P_{in}$ is the input power of the incident beam and $P_{out}$ is the power of the steered beam. The diffraction efficiency, defined as $\eta=P_{out}/P_{tot}$ (where $P_{tot}$ is the total transmitted power into the exit or output hemisphere), was also calculated. As used herein, "diffraction efficiency" may refer to the output intensity of a particular diffraction order divided by the total light intensity transmitted, which may be used as a normalization to remove the effects of the substrates and/or other layers and allows direct comparison to Eq. 1.

FIG. 5A shows transmittance and efficiency of the steered beam at the (intended) steered angle for different steered angles. In particular, FIG. 5A shows high transmittance (from about 92% to about 89%), with some variation depending on the steering angle. Since each glass/LC interface has about 1% Fresnel type reflection loss, the substrates may be responsible for about 4% of the transmittance loss. The remaining loss may be due to leakage into sidelobe directions, as illustrated in FIG. 5B.

FIG. 5B illustrates transmittance at observation angles over a range of ±40° for three steering angles (0° and ±30°). Note that the diffraction efficiency may be even higher, since the loss due to substrates is normalized away. In order to explore the severity of sidelobe leakage (for the two extreme and center angles), FIG. 5B shows the fraction of transmitted power measured at observation angles when the PGs were fixed. In such cases, the sidelobe leakage occurred at angles that were multiples of θg, and were in the range of about 1% to about 6%. This leakage may result from oblique incidence to the second PG, and can be reduced by the use of higher birefringence LC materials and/or additional retardation compensation films in between the two PGs (similar to display applications). Less than about 0.5% absorption and scattering was observed. The reflection loss and/or absorption can be further improved with the use of enhanced index-matched (glass/LC) substrates. While these tests were performed using input light having a wavelength of about 1550 nm with approximately 5 W/cm² intensity without degradation, tests with similar PGs at 1064 nm at about 2000 W/cm² intensities have been conducted with the similar results. Accordingly, in some embodiments of the present invention, polymer PGs formed with commercial materials on index-matched substrates (with no electrodes and less than about 0.01% LC absorption) may be used to steer very high beam powers (for example, many kW/cm² at near-infrared wavelengths), especially as compared to other electrically controlled LC devices (with, at best, electrodes having about 0.2% absorption each).

As compared to Risley Prisms, the "Risley Gratings" according to some embodiments of the present invention employ different elements (gratings vs prisms), operate on different principle (diffraction vs refraction), and more diverse variations (since PGs are polarization sensitive). In particular, the above embodiments have demonstrated that two or more rotating in-line PGs may be used to provide an efficient beam steering device, with a relatively compact and lightweight form factor. Beam steering devices according to some embodiments of the present invention can continuously steer within a FOR of about 62°, and manifest a transmittance of up to about 92% or more into the steered direction, with sidelobe leakage on the order of a few percent. In the above embodiments, two identical PGs (with Λ=6 μm) were employed with about ±31° maximum deflection angles at 1550 nm wavelengths; however, it is to be understood that the PGs need not be identical, and may be non-identical (for example, having different grating periods) in some embodiments. Each PG may be a thin-plate and can be formed at almost arbitrarily large areas, and may reduce and/or eliminate beam walk-off. Larger steering angles, further loss reduction, and/or implementation at other wavelengths may also be achieved through continued optimization of substrates and PG materials.

Nonmechanical beam steering devices based on polarization gratings (PGs) according to some embodiments of the present invention also employ multiple stages including combinations of PGs and wave plates (WPs), and allow for a three-way (ternary) steering design in some embodiments. Ultra-high efficiency (e.g., up to about 100%) and polarization sensitive diffraction of PGs according to some embodiments of the present invention may allow for relatively wide steering angles (among three diffracted orders) with relatively high throughput. Three-stage beam steerers according to embodiments of the present invention may have about a 44° field-of-regard (FOR) with a resolution of about 1.7° at wavelengths of about 1550 inn. Some embodiments may also provide a relatively high throughput or transmittance of about 78% to about 83%, which may be limited by electrode absorption and Fresnel losses.

FIGS. 6A-B and 7A-B illustrate nonmechanical beam steering devices including stacked or laminated arrangements of at least one polarization selector and at least two polarization gratings (PGs) in accordance with some embodiments of the present invention. In embodiments of the present invention, each PG can both add and subtract from the steered angle, which enables a wider range of angles to be steered by the same number of elements. The polarization selector causes its output to be either of two orthogonal polarization states (in FIGS. 6A-B and 7A-B, left/right circular polarizations). The liquid crystal polarization gratings (LCPGs) illustrated in FIGS. 6A-B and 7A-B are three-state elements that can redirect or transmit light into three possible directions, established by the m=0 and m=±1 orders of the grating equation ($\theta_{OUT}=\sin^{-1}(m\lambda/\Lambda+\sin\theta_{IN})$, where the order m depends on the incident polarization (left or right handedness selects m=+1 or −1, respectively) and the voltage on the PG itself (selecting m=0 or |m|=1). In addition, the LCPGs reverse the polarization of transmitted light when they diffract into their first-orders, but preserve the polarization of transmitted light when the light is directed into their zero order. Note that while the following discussion is limited to one dimension (1D) of steering, it should be understood that some embodiments of the present invention may provide two dimensional (2D) steering by arranging two steering assemblies of the type in FIGS. 6A-B, one for the horizontal (azimuth) direction and the other for the vertical (elevation) direction. In the embodiments of FIGS. 6A-B and 7A-B, the circularly polarized incident light may be provided by a laser, potentially in combination with additional intermediate optics.

FIGS. 6A and 6B illustrate a "quasi-ternary" polarization grating beam steering apparatus 600a and 600b according to some embodiments of the present invention, where the number of PG stages N=2; however, additional PG stages may be provided in some embodiments. In particular, FIG. 6A is an exploded schematic diagram of light propagation within and exiting the beam steering apparatus 600a, while FIG. 6B is a schematic view of the assembled beam steering apparatus 600b where the layers are laminated. As shown in FIG. 6A, the quasi-ternary beam steering apparatus includes a LC waveplate 605 (i.e., a polarization selector) followed by two polarization gratings 601 and 602. As such, the waveplate 605 and the PG 601 may define a first beam steering stage of the apparatus, while the PG 602 may define a second beam steering stage. Beam steering is accomplished as follows: (1) normally incident light exits the waveplate 605 with left/right polarization handedness; (2) the first PG 601 (with grating period $\Lambda_1$) transmits light by diffraction into any of the three propagation angles $\{+\lambda/\Lambda_1, 0, -\lambda/\Lambda_1\}$; and (3) the second PG 602 (with grating period $\Lambda_2$) transmits light by diffraction by adding/subtracting the angles $\{0,$ and either $+\lambda/\Lambda_2$ or $-\lambda/\Lambda_2\}$ to the propagation angle of light incident to the second PG 602, as selected by the state of the second PG 602 and the incident polarization. A feature of this quasi-ternary design 600a is that the number of possible steering angles is $2^{(N+1)}-1$, where N is the number of PGs (here, N=2).

FIGS. 7A and 7B illustrate a "full-ternary" polarization grating beam steering apparatus according to some embodiments of the present invention, where the number of PG stages N=2; however, additional PG stages may be provided in some embodiments. In particular, FIG. 7A is an exploded schematic diagram of light propagation within and exiting the beam steering apparatus 700a, while FIG. 7B is a schematic view of the assembled beam steering apparatus 700b where the layers are laminated. As shown in FIG. 7A, the full-ternary beam steering apparatus includes an LC waveplate or polarization selector 705 and PGs 701 and 702 in an arrangement similar to that of FIG. 6A, but further includes an additional waveplate or polarization selector 710 between the PGs 701 and 702. As such, the waveplate 705 and the PG 701 may define a first beam steering stage of the apparatus, while the waveplate 710 and the PG 702 may define a second beam steering stage. Beam steering through this design is similar to the embodiment of FIG. 6A, as each stage can add/subtract steering angles. However, the use of additional waveplates (as polarization selectors) may allow an even wider range of possible steering angles, since the polarization state incident on any particular PG may be independently controlled by providing a preceding polarization selector. The polarization selector(s) 705 and 710 may be switchable between a first state that does not affect polarization and a second state that reverses the polarization of the incident beam. A feature of this full-ternary design is that the number of possible steering angles is $3^N$, where N is the number of PGs (here, N=2).

In the embodiments of FIGS. 6A-B and 7A-B, the PGs 601, 602, 701, and 702 are described as being switchable LCPGs (which is formed as a switchable LC layer between two electrodes), also referred to as "active" PGs. However, it is to be understood that, in some embodiments of the present invention, one or more of these switchable PGs may be individually replaced by an LC halfwave-plate sandwiched between two polymer or "passive" PGs. This may, in some cases, allow for improved efficiency at higher diffraction angles. This is shown in FIGS. 8A and 8B. In particular, FIG. 8A illustrates a passive PG arrangement 800a for a quasi-ternary beam steering apparatus, such as the apparatus of FIGS. 6A-B. Likewise, FIG. 8B illustrates a passive PG arrangement 800b for a full-ternary beam steering apparatus, such as the apparatus of FIGS. 7A-B. In particular, the arrangement 800a includes a waveplate 803a, a first set of polymer PGs 801a and 801a' having a waveplate 804a sandwiched therebetween, and a second set of polymer PGs 802a and 802a' with a waveplate 805a sandwiched therebetween. The arrangement 800b similarly includes a waveplate 803b, a first set of polymer PGs 801b and 801b' having a waveplate 804b sandwiched therebetween, and a second set of polymer PGs 802b and 802b' with a waveplate 805b sandwiched therebetween, and further includes a waveplate 806b between the first and second sets of polymer PGs.

Non-mechanical beam steering devices according to some embodiments of the present invention are based on the polarization sensitive properties of the polarization gratings (PGs) described herein. In particular, polarization gratings according to embodiments of the present invention are capable of diffracting incident light into one of the three diffracted orders ($0^{th}$ and ±1st), based on the input polarization and the applied voltage. The unique properties of PGs can provide very high diffraction efficiency (for example, up to about 100%) for various diffraction angles. Also, the thickness of the PGs is independent of the aperture size, allowing for relatively wide angle steering with large aperture. Moreover, since the PGs are relatively thin diffractive elements, beam steering devices according to some embodiments of the present invention may be relatively compact and/or light weight. Particular embodiments of the present invention provide a three-stage beam steerer including multiple stacked beam steering stages that provides several dozen discrete steering angles with high throughput (for example, about 80% to about 95%) within a wide field-of-regard (FOR) of up to about 90°. This ternary design uses minimum steering stages for the same steering angles and the number of steering angles is increased exponentially as increasing the number of stages.

FIGS. 9A and 9B illustrate the structure and diffraction properties of liquid crystal PGs according to some embodiments of the present invention. In particular, FIG. 9A is a plan view illustrating a PG 901 in the "off-state," while FIG. 9B is a cross-sectional view illustrating the orientation of the LC molecules in the PG 901 in both the "off-state" (left side) and in the "on-state" (right side). The PG 901 has a similar structure to the PG 201 of FIG. 2A, and includes a switchable LC layer 905 provided between photo-alignment layers 915 and indium-tin-oxide electrodes 912 on respective first and second glass substrates 910 and 925. As shown in FIG. 9B, the PG 901 exhibits different diffraction behavior depending on the polarization of the incident light (e.g., depending on whether the light incident thereon has right-handed circular polarization (RCP) or left-handed circular polarization (LCP)). The PG 901 of FIGS. 9A-B is a switchable nematic Liquid Crystal (LC) PG having continuous in-plane bendsplay patterns shown in FIG. 9A. The diffraction efficiencies of such an element can be expressed as follows:

$$\eta_0 = \cos^2\left(\frac{\pi \Delta n d}{\lambda}\right) \quad (4a)$$

$$\eta \pm 1 = \frac{1 \mp S'_3}{2} \sin^2\left(\frac{\pi \Delta n d}{\lambda}\right) \quad (4b)$$

where $\eta_m$ is the diffraction efficiency of the m order, $\Gamma=2\pi\Delta nd/\lambda$ is the retardation of the LC layer, $\lambda$ is the wavelength of incident light, and $S'_3=S_3/S_0$ is the normalized Stokes parameter corresponding to ellipticity of the incident light. Up to 100% incident light is diffracted into only one of the first orders when the input light is circularly polarized ($S'_3=\pm 1$) and the retardation of the LC layer 905 is halfwave ($\Delta nd=\lambda/2$), as shown on the left side of FIG. 9B. Note that the polarization state of the first order is orthogonal circular to the input polarization. When voltage is applied to the LC layer 905 via the electrodes 912, as shown on the right side of FIG. 9B, the grating profile is effectively erased and the input beam passes through the PG 901 substantially unaltered in terms of polarization and propagation angle and direction (e.g., all are substantially unaffected). Diffraction efficiencies of nearly 100% have been achieved using PGs according to some embodiments of the present invention over a wide range of grating periods (e.g., from few μm to mm), wavelengths (e.g., from visible to mid-IR), and areas (many cm²) with relatively fast switching times (e.g., a few milliseconds).

As discussed in greater detail below, nonmechanical beam steering devices according to some embodiments of the present invention include two or more steering stages, each containing a PG and a half-wave plate (WP). In such beam steering devices, each stage provides three possible steering directions, such that each stage can both add and subtract from the steered angles. Such a ternary design enables a wider range of angles to be steered by the same number of elements.

Figure 10A:
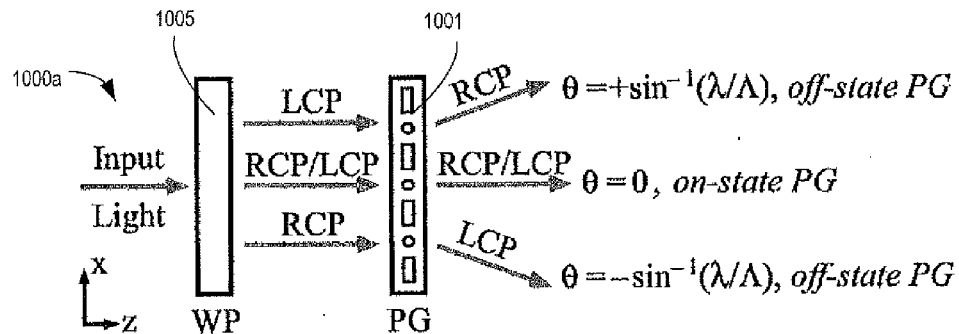
FIG. 10A is an exploded view illustrating the beam configuration of single nonmechanical beam steering stage according to some embodiments of the present invention.

FIG. 10A is an exploded view illustrating the beam configuration of single steering stage 1000a according to some embodiments of the present invention. In FIG. 10A, a single steering stage 1000a includes a switchable PG 1001 and a switchable WP 1005, which acts as a polarization selector. The WP 1005 ensures that the output beam is either of the two orthogonal (left-handed or right-handed) circular polarization states. When no voltage is applied to the PG 1001, depending on the handedness of the circular polarization, the PG 1001 diffracts the beam output from the WP 1005 into one of the ±1st orders (+θ or -θ) and flips (i.e., reverses) its handedness. The diffraction angle is established by the grating equation $\theta_{out}=\sin^{-1}(m\lambda/\Lambda+\sin\theta in)$, where the order m depends on the incident polarization (left handedness: m=+1, right handedness: m=-1). But when a voltage V>Vth is applied, the grating profile is effectively erased (i.e., $\Delta n\approx 0$) and the incident light passes through the PG 1001 preserving its polarization state (m=0).

Figure 10B:
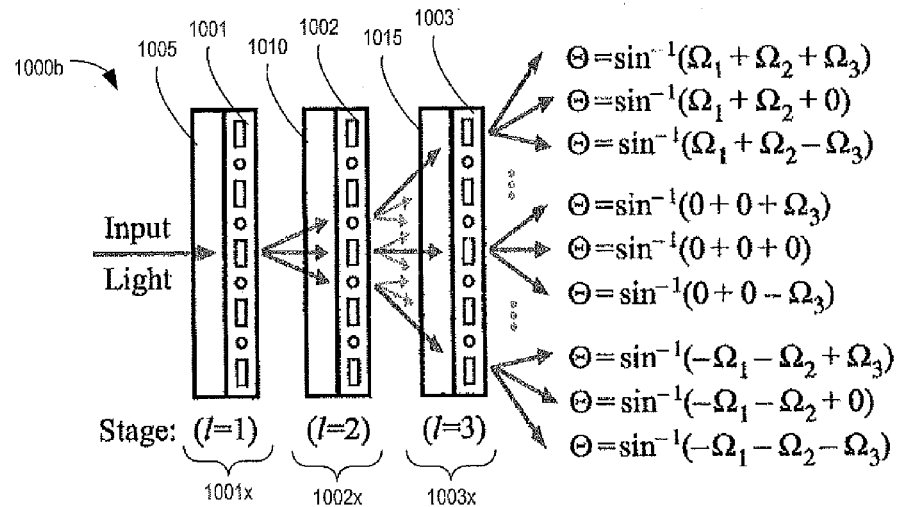
FIG. 10B is an exploded view illustrating the beam configuration of a three-stage ternary nonmechanical beam steering device in accordance with some embodiments of the present invention.

FIG. 10B is an exploded view illustrating the beam configuration of a three-stage ternary beam steering device 1000b with detailed steering angles (27 angles in total; however, only 9 angles are shown) in accordance with some embodiments of the present invention. More particularly, FIG. 10B shows an N-stage ternary design including N WPs and N PGs (where N=3), where each stage 1001x, 1002x, and 1003x includes a switchable polarization selector and a switchable polarization grating having a different grating period $\Lambda$, thereby providing a different set of angles. Each stage 1001x, 1002x, and 1003x provides three possible steering directions for an input beam, and can add to or subtract from the propagation angle of the input beam (or leave it unchanged). In the first stage 1001x, normally incident light exits the WP 1005 with left/right polarization and the PG 1001 (with a grating period $\Lambda_1$) transmits light by diffraction into any of the three angles $+\lambda/\Lambda_1$, 0, $-\lambda/\Lambda_1$. The second stage 1002x (with a grating period $\Lambda_2$) transmits light by passing, or adding/subtracting the angles $\lambda/\Lambda_2$ to the angle of light incident to the stage, depending on the selected state of the PG 1002 and the incident polarization provided by the WP 1010. Likewise, the third stage 1003x (with a grating period $\Lambda_3$) transmits light by passing, or adding/subtracting the angles $\lambda/\Lambda_3$ to the angle of light incident to the stage, depending on the selected state of the PG 1003 and the incident polarization provided by the WP 1015.

The angle resolution of an N-stage ternary steerer according to some embodiments of the present invention is determined by the smallest diffraction angle of the PG (r in this example), and diffraction angles for other stages are increased by a factor of 3 (i.e., r, 3r, ... $3^{N-1}$r). By adding stages with larger diffraction angles, the FOR of the beam steerer can be increased by a factor of three (e.g., three times more steering angles) in some embodiments. On the other hand, such a ternary design may allow for fine angle steering, which provides three times finer resolution by adding additional stages with smaller diffraction angles in some embodiments. Stages with such angle configurations may be used in an N-stage ternary steerer according to embodiments of the present invention that provides a ($3^N-1$)r FOR with a maximum number of steering angles M=$3^N$.

The exponential increase of M is highlighted in FIG. 10B. The diffraction angle $\theta_l$ and grating period $\Lambda_l$ of each stage number l is expressed as:

$$\sin\theta_l = \sin((3^l-1)r/2) - \sin((3^{l-1}-1)r/2) \quad (5a)$$

$$\Lambda_l = \lambda/\sin\theta_l, \quad (5b)$$

where $\lambda$ is the wavelength of the incident beam. The overall output angle $\Theta$ can be expressed as:

$$\sin\Theta = \sum_{l=1}^{N} = (-1)^{V_l^{WP}} V_l^{PG} \sin\theta_l \quad (6)$$

where $V_l^{WP}$ is the state of the $l^{th}$ WP (0 or 1 when the WP output is LCP or RCP, respectively), and $V_l^{PG}$ is the state of the $l^{th}$ PG (0 or 1 when V>>$V_{th}$ or V=0, respectively).

If the PG efficiency and losses of each stage are assumed to be the same in some embodiments, the overall system transmittance T can be approximated as:

$$T=(\eta_{+1})^N(1-D)^N(1-R)^{2N}(1-A)^{2N}, \quad (7)$$

where $\eta_{+1}$ is the experimental intrinsic diffraction efficiency of each PG, D is the diffuse scattering of each PG, and where R and A are Fresnel reflectance and absorption losses, respectively, of each LC cell. Based on a loss analysis below, a steering system with about 44° FOR and about 1.7° resolution in accordance with some embodiments can operate with a transmittance of up to approximately 95% or more.

Figure 10C:
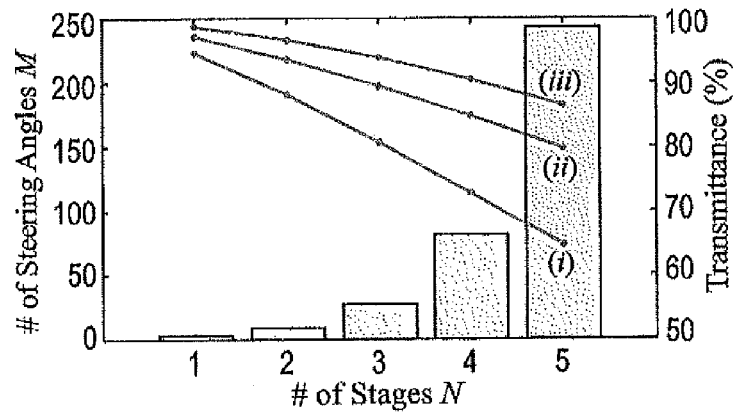
FIG. 10C is a graph illustrating the transmittance T versus the steered angle for a three-stage ternary nonmechanical beam steering device in accordance with some embodiments of the present invention.

FIG. 10C illustrates the transmittance T versus the steered angle for three cases. Case (i) corresponds to experimentally demonstrated parameters (where $\eta_{+1}\approx 99.6\%$, D=0.3%, R=1.2%, and A=1.0%), and where indium-tin-oxide (ITO) electrodes were implemented. In case (ii), commercially available index-matched ITO electrodes are used to reduce R=0.1%. Case (iii) corresponds to a scenario where low loss transparent conductors are employed to reach A=0.2% (e.g., the performance expected from Transcon 1000 Ω/sq conductors). Accordingly, the reduction in transmittance in case (i) may be due to absorption from the conducting layers (~1% per layer) and/or Fresnel losses from air-glass interfaces (~1.5% from substrates). Thus, overall transmittance can be improved by implementing the beam steering devices described herein with index-matched glasses with low absorption losses. In all cases, a roughly linear decrease in T as N increases is observed, along with a simultaneous increase in M. As many steering applications may require 25≤M≤100, T may be expected to be between about 72% and 94%.

The PGs used for each steering stage may be formed as liquid crystal cells created by polarization holography and commercial photo-alignment materials. In the above embodiments, a linear photopolymerizable polymer (LPP) ROP-103/2CP (Rolic) was used as a photoalignment material, and orthogonally circularly polarized beams from a He—Cd laser (325 nm) were used to record the PG pattern. The cell thickness was chosen to be about 2.5 µm to provide half-wave effective retardation with the nematic liquid crystal LCMS-102 (from Boulder Nonlinear Systems, where Δn=0.31 at 1550 nm). To reduce reflection loss, all LC elements were laminated to each other with optical glue (NOA-63, Norland), and glass with anti-reflection coatings (PG&O) were glued to the front and back faces. The parameters $\Lambda_l$ and $\theta_l$ of each PG were chosen according to Eqs. 5. In particular, for stage l=1, $\theta_l$=1.7°, $\Lambda_l$=52.6 µm, $D_l$=0.0%, and $\eta_{+1}$=99.9%; for stage l=2, $\theta_l$=5.1°, $\Lambda_l$=17.5 µm, $D_l$=0.3%, and $\eta_{+1}$=99.8%; and for stage l=3, $\theta_l$=14.9°, $\Lambda_l$=6.0 µm, $D_l$=1.6%, and $\eta_{+1}$=99.7%. The three WP were fabricated in a similar fashion, but with uniformly aligned LPP layers, All LC cells were measured using a spectrophotometer to have R≈1.2% and A≈1.0%.

To obtain an experimental quantity $\eta_{+1}$ comparable to Eq. 4b, the intrinsic diffraction efficiency of order m is defined as m=$\eta_m$=$P_m$/($P_{-1}$+$P_0$+$P_{+1}$), where $P_m$ is the measured power of the $m^{th}$ diffraction order when the input is circularly polarized. The scattering loss D is defined as the fraction of transmitted light (for example, as measured using an integrating sphere) that does not appear within one of the three diffraction orders. Accordingly, PGs according to embodiments of the present invention may exhibit diffraction properties such that about 99.7% or more of the incident light is steered into the intended direction without observable higher orders ($\eta_0$≤0.2%, $\eta_{m≥2}$<0.05%). Particular embodiments provide a beam steering system including three pairs of PGs and WPs to provide a FOR of about 44° with a resolution of about 17° at about 1550 nm wavelength.

Figure 11A:
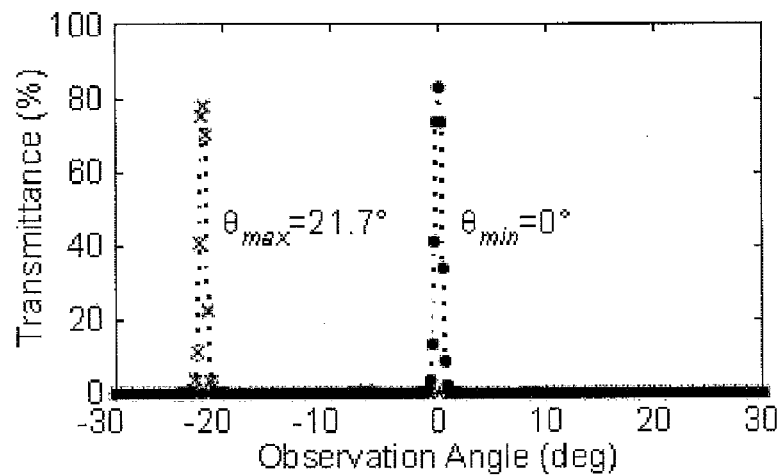
FIG. 11A is a graph illustrating transmittance of a beam steered using nonmechanical beam steering according to some embodiments of the present invention for different observation and steering angles.
Figure 11B:
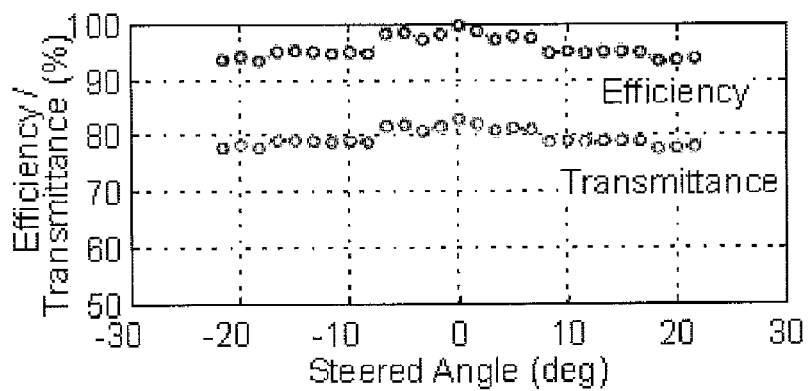
FIG. 11B is a graph illustrating transmittance and diffraction efficiency for the mainlobe of a nonmechanical beam steering device in accordance with some embodiments of the present invention.
Figure 11C:
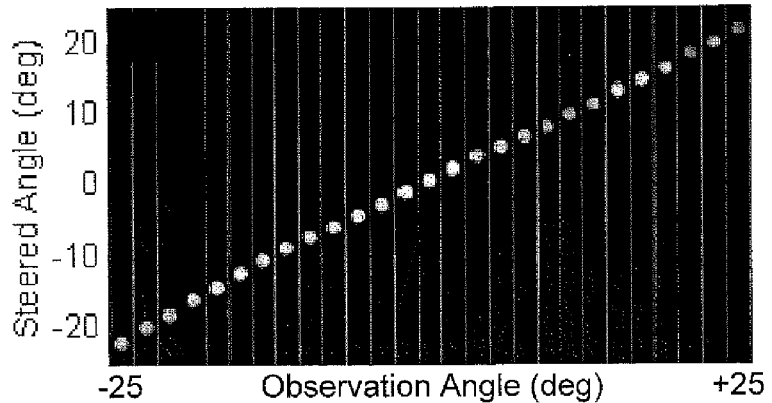
FIG. 11C is a photograph illustrating steered beams provided by a nonmechanical beam steering device in accordance with some embodiments of the present invention.

FIG. 11A-C illustrate experimental results of 3-stage ternary beam steering device according to some embodiments of the present invention. In particular, FIG. 11A shows power distributions between ±30° for two different steered angles of 22° (θmax; all PGs diffracting) and 0° (θmin; all PGs non-diffracting). A sidelobe of about 0.8% appears at about −6.8° for the diffracting case. Accordingly (as also shown in FIG. 11C), very low sidelobes are observed throughout the steering range.

FIG. 11B illustrates transmittance and diffraction efficiency for the mainlobe for a range of steering angles of a 3-stage beam steering device in accordance with some embodiments of the present invention. The measured transmittance may be calculated as T=$P_{main}$/$P_{in}$, where $P_{main}$ is the mainlobe power and $P_{in}$ is the input power. The efficiency, a normalization that may be used to remove the effect of the substrates to reveal the aggregate effect of the diffractive PGs, may be defined as $\eta$=$P_{main}$/$P_{tot}$, where $P_{tot}$ is the total transmitted power into the exit hemisphere (for example, as measured using an integrating sphere).

FIG. 11C is a photograph illustrating 27 steered beams on an IR sensitive detection card placed about 30 cm away from the steering system. The range of steered spots were well aligned to each other and no significant walkoff was observed. The transmittance of beam steering systems according to some embodiments of the present invention was between about 78% and about 83%, while the absolute efficiency (which includes the effects of scattering while normalizing out the effect of the substrates) was between about 94% and about 99% for the range of steering angles. Accordingly, losses may be predominantly attributable to substrate absorption and reflection, and PGs according to some embodiments of the present invention may provide efficient redirection of light even when the incidence angle is far from the normal direction. While the above embodiments describe steering in one dimension (1D), it is to be understood that some embodiments of the present invention may provide a 2D steering system including individual stages for azimuthal and elevation control.

In summary, PGs according to some embodiments of the present invention may be used in a ternary design to provide wide-angle nonmechanical beam steering devices with a FOR of about 44° and a resolution of about 1.7° at 1550 nm. Beam steering devices according to some embodiments of the present invention may provide high optical throughput (about 78% to 83%) that can be improved by optimization of substrates and electrode materials. Accordingly, beam steering devices according to some embodiments of the present invention can efficiently steer light into a wide FOR with very low sidelobes, and provide the potential for large beam diameters and thin assemblies for low beam walk-off. Moreover, PG fabrication according to some embodiments of the present invention may be is relatively easier and more cost-effective compared to conventional approaches. In the nonmechanical embodiments, a further advantage is that the number of possible discrete steering angles scales exponentially with each PG (e.g., $3^N$, where N=the number of PGs).

Nonmechanical beam steering devices according to some embodiments of the present invention are further described below in greater detail. In particular, some embodiments of the present invention provide a compact, nonmechanical beam steering device based on liquid Crystal (LC) Polarization Gratings (PGs). Directional control of collimated light may be essential for free-space optical communications, remote sensing, and related technologies. Current beam steering methods may require moving parts, may be limited to small angle operation, may offer low optical throughput, and/or may be constrained by size and weight. Nonmechanical beam steering devices according to some embodiments of the present invention employ multiple layers of LCPGs to achieve wide-angle (>±40°), coarse beam steering of 1550 nm light in a relatively thin package. LCPGs can be made in switchable or polymer materials and possess a continuous periodic birefringence profile that renders several properties (which have been experimentally realized), such as: up to 100% experimental diffraction efficiency into a single order, relatively high polarization sensitivity, and relatively low scattering. Light may be controlled within and between the zero- and first-diffraction orders by the handedness of the incident light and potentially by voltage applied to the PG itself. A coarse steering device according to some embodiments of the present invention includes several LCPGs matched with active halfwave LC variable retarders.

A nonmechanical beam steering approach may be important to many applications where the optical direction of the instrument changes rapidly to random locations, or where a system with relatively compact dimensions and good mechanical stability is desired. In laser communication systems, for example, it may be desirable to direct the beam to a receiver for tracking precisely with a good mechanical stability. Also, in LIDAR (LIght Detection And Ranging) systems, it may be desirable to steer beams over a large field of regard (FOR) with high precision.

Some embodiments of the present invention provide nonmechanical beam steering using two stages, where a coarse steering technique is combined with a fine steering module, as shown in FIG. 12. In particular, FIG. 12 illustrates a beam steering system 1200 with fine 1205 and coarse 1210 steering modules providing full 80×80 field-of-regard (FOR) 1215. These two modules 1205 and 1210 may be implemented separately or in combination to offer the coverage and accuracy that may be desirable for different applications. Some embodiments of the present invention as described herein provide a compact two-dimensional coarse steering module based on Liquid Crystal Polarization Gratings (LCPGs) that exhibits wide-angle deflection, high overall transmittance, and a relatively thin package that is practically independent of the steered beam diameter. In particular, the beam steering properties of LCPGs are described herein, and a single LCPG stage that may be interlaced to provide a coarse steerer is further described. In addition, several design options for coarse beam steering according to embodiments of the present invention are described herein and compared based on their respective efficiencies.

A nonmechanical approach for beam steering may be more accurate, faster, more compact, lighter, and/or less expensive than systems using mechanical parts. Such systems may be used, for example, in optical interconnections, optical communications, and/or projection displays. One approach to nonmechanical beam steering is referred to as holographic glass, which includes multiple holographic gratings within each glass substrate (usually two or less, in order to reduce scattering and other losses). While efficiency of individual gratings can be quite high, some limitations of this approach may include the necessity for two fine-angle steering stages, and that the number of gratings is linearly proportional to the steering angular range. Using holographic glass to achieve a range of about +40° in one dimension and a resolution of about 1.25° may require at least 32 glass substrates (if each has two multiplexed gratings). Such systems may be relatively thick, and may allow the losses of each stage to compound. In comparison, LCPG approaches to beam steering in accordance with some embodiments of the present invention can be configured to reach the same steering range and resolution (e.g., about ±40° and about 1.25°, respectively), with as few as 5 gratings in some embodiments.

Another approach to nonmechanical beam steering uses multiple stages of birefringent prisms to steer the beam. Each stage may add incremental angular deflections by altering the polarization states at the input of each birefringent prism. However, relatively thick prisms may be needed for large steering angles, which may result in significant walkoff and/or lead to relatively long systems, where the length may be many times larger than the beam diameter. In contrast, beam steering devices according to some embodiments of the present invention employ a thin diffractive element, thereby dramatically reducing the size, weight, and/or walkoff. Embodiments of the present invention may also provide comparably low losses, up to 100% diffraction grating efficiencies, wide-angle operation, and/or overall thin package potential as compared to the above approaches.

Particular embodiments of the present invention employ a nematic LC film with a continuous periodic pattern, which can be classified as a polarization grating (PG). PGs may be used in many applications, including microdisplays, tunable filters, spectrophotometers, and imaging spectropolarimeters. Unlike amplitude and phase gratings, PGs operate by modulating the polarization of light. Due to this, PGs according to some embodiments of the present invention can be used for constructing polarization sensitive steering device, capable of highly efficient wide-angle operation.

Figure 13A:
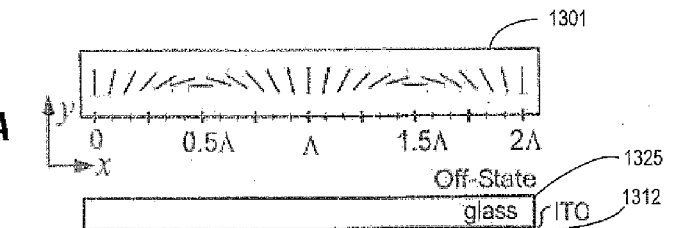
FIG. 13A illustrates a top-view geometry of liquid crystal polarization gratings (LCPGs) according to some embodiments of the present invention.
Figure 13B:
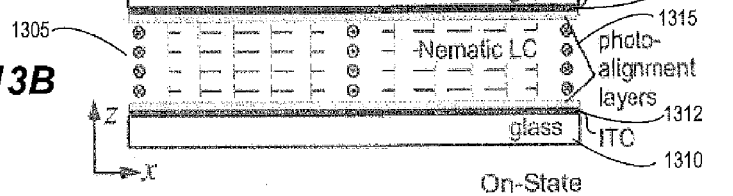
FIG. 13B illustrates a side-view geometry of liquid crystal polarization gratings (LCPGs) according to some embodiments of the present invention in the off-state.
Figure 13C:
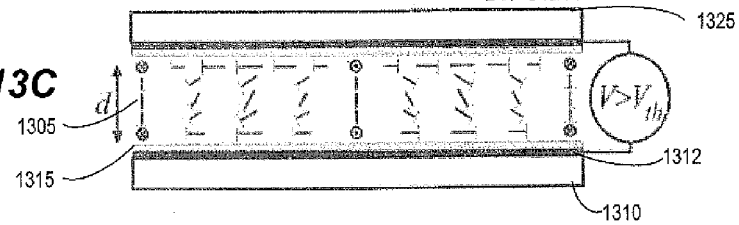
FIG. 13C illustrates a side-view geometry of liquid crystal polarization gratings (LCPGs) according to some embodiments of the present invention in the on-state.
Figure 13D:
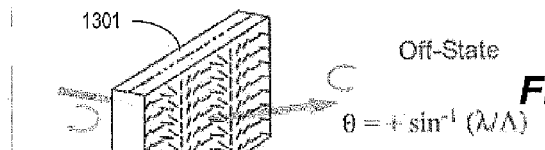
FIGS. 13D, 13E, and 13F are perspective views illustrating diffraction behavior of liquid crystal polarization gratings (LCPGs) according to some embodiments of the present invention.
Figure 13E:
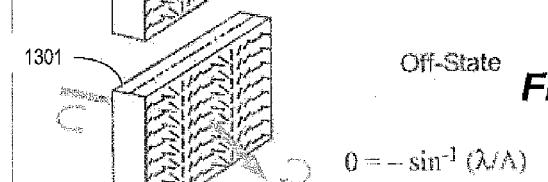
Figure 13F:
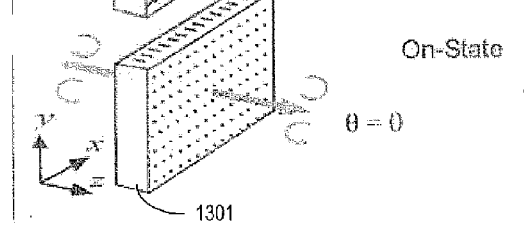

FIGS. 13A-F illustrate the structure and diffraction properties of liquid crystal polarization gratings (LCPGs) 1301 according to some embodiments of the present invention. In particular, FIG. 13A illustrates a top-view geometry and FIG. 13B illustrates a side-view geometry of the continuous, in-plane configuration of the nematic LC layer 1305 with a periodic linear birefringence (e.g., the "off-state"), and FIG. 13C illustrates a side-view geometry with the applied voltage (e.g., the "on-state"). The structure illustrated in FIGS. 13B and 13C, which is similar to that of FIG. 9B, includes a switchable LC layer 1305 provided between photo-alignment layers 1315 and indium-tin-oxide electrodes 1312 on respective first and second glass substrates 1310 and 1325. In addition, FIGS. 13D, 13E, and 13F illustrate diffraction behavior with right hand circularly polarized (RCP) incident light when LCPG 1301 is in the "off-state," left hand circularly polarized (LCP) incident light when LCPG 1301 is in the "off-state," and incident light transmitted on-axis (zero-order diffraction direction) when LCPG 1301 is in the "on-state," respectively.

As shown in FIGS. 13A and 13B, the structure of an LCPG 1301 according to some embodiments of the present invention includes an in-plane, uniaxial birefringence that varies with position (i.e. $n(x)=[\sin(\pi x/\Lambda), \cos(\pi x/\Lambda), 0]$), where $\Lambda$ is the grating period. This structure may be created by interfering two orthogonally circular-polarized ultraviolet laser beams recorded within a polarization-sensitive photo-alignment material. This interference leads to the structure illustrated in FIGS. 13A and 13B where the linear birefringence is embodied in a nematic director $n(x)$. The diffraction efficiency at normal incidence can be derived with Jones calculus, as provided above in Eq. 4a and 4b, which are reproduced below for convenience:

$$\eta 0 = \cos^2\left(\frac{\pi \Delta n d}{\lambda}\right) \quad (4a)$$

$$\eta \pm 1 = \frac{1 \mp S'_3}{2} \sin^2\left(\frac{\pi \Delta n d}{\lambda}\right) \quad (4b)$$

where $\eta_m$, is the diffraction efficiency of the m diffraction order, $\Delta n$ is the birefringence of liquid crystal, d is the thickness of the cell, $\lambda$ is the wavelength of incident light, and $S'_3 = S3/S0$ is the normalized Stokes parameter corresponding to ellipticity of the incident polarization. Note that the paraxial approximation and a thin grating with the infinite width at normal incidence may be assumed to derive the analytical solutions.

From the Eq. 4a and 4b, several properties of LCPGs according to some embodiments of the present invention can be derived. If the thickness is chosen as $d=\lambda/2\Delta n$ (halfwave retardation of the LC layer), zero-order transmission may be zero ($\eta 0=0$) and the output light may be deflected to the first orders ($\Sigma \eta_{\pm 1}=1$). Moreover, the first orders may be highly sensitive with respect to the S'3 parameter, while the zero-order may be polarization independent. Therefore, when the incident light has right handed circular polarization (RCP), S'3=−1, then diffraction efficiency is η+1=1 and η−1=0. As such, the light passing through the LCPG is diffracted into the positive first order. In the opposite case, if the incident light has left handed circular polarization (LCP), S'3=+1, the light passing through the LCPG is diffracted into the negative first order (η−1=1).

Note that three diffracted orders are possible (regardless of grating period, thickness, or materials): zero and two first-orders. Moreover, after passing through the LCPG, the handedness of circular polarized light is changed to the opposite state since the light experiences a relative phase shift due to the LC layer. More particularly, as shown in FIG. 13D, once RCP light passes through the LCPG 1301, the polarization state of the light is changed to LCP. Alternatively, as shown in FIG. 13E, when LCP light passes through the LCPG 1301, the output light is RCP.

The diffraction angles may be determined by the grating equation provided below, as the LCPG is a birefringent grating:

$$\sin\theta_m = \left(m\frac{\lambda}{\Lambda}\right) + \sin\theta_{in} \quad (8)$$

where $\theta_{in}$ is the incident angle, $\theta_m$ is the angle of diffraction of transmitted light, and m={−1, 0, +1} is the diffraction order. An optical communication which uses 1550 nm wavelength light, for instance, may use a 8.93 µm grating period of LCPG to perform θ=10° diffraction angle. PGs in accordance with embodiments of the present invention can retain relatively high diffraction efficiencies for modest incident angles (≤20°). For the non-diffracting case (zero-order), an applied voltage greater than a voltage threshold will reorient the LC director out of the plane and reduce the effective birefringence toward zero (Δn→0), as shown in FIG. 13C. By effectively erasing the grating of LCPG 1301, incident light can pass directly through the PG 1301 without any change of polarization state, propagation angle, and/or direction, as shown in FIG. 13F.

FIGS. 14A-C illustrate experimental results achieved using LCPGs in accordance with some embodiments of the present invention. FIG. 14A shows the spectral response of the zero-order transmission for LCPGs in accordance with some embodiments of the present invention for different values of applied voltage: 0V, 2V, and 10V. As shown in FIG. 14A, if the LCPG is initially designed such that no zero order is present in the communication wavelength (1550 nm), an applied voltage which is higher than threshold voltage can erase the gratings and provide up to 100% zero order transmittance. FIGS. 14B and 14C show polarizing optical microscope images of LCPGs with different applied voltages. In particular, FIG. 14B illustrates microscope images without applied voltage (0V), while FIG. 14C illustrates microscope images with applied voltage of 2V and 10V higher than threshold. In these images, the LCPG is located between crossed polarizers and the black fringes correspond to areas where the LC molecules are oriented to the one of polarizers' axis. As the voltage is increased, the structure of LCPG may lose its periodic nature.

PGs according to some embodiments of the present invention may also be fabricated with polymerizable liquid crystals, known as reactive mesogens, which may enable lower scattering losses while allowing for smaller grating periods; however, since grating of a polymerized PG is fixed, rather than switchable, the grating may not be erased with an applied voltage to allow the incident light to pass directly through without a change in polarization state. Some embodiments of the present invention provide PGs having greater than 99.5% experimental diffraction efficiency with both switchable-type and polymer-type PGs.

Based on the above-described properties, LCPGs in accordance with some embodiments of the present invention can efficiently diffract circularly polarized light to either zero or first orders, based on the polarization handedness of the input light and the applied voltage. Moreover, as the PG's thickness is independent of the aperture size and deflection angle, wide-angle steering with large apertures can be provided. Since the deflection angles of PGs according to some embodiments of the present invention are based on the grating period, each grating stage can be stacked to double the maximum steered angle in one dimension without significant efficiency reductions.

Figure 15A:
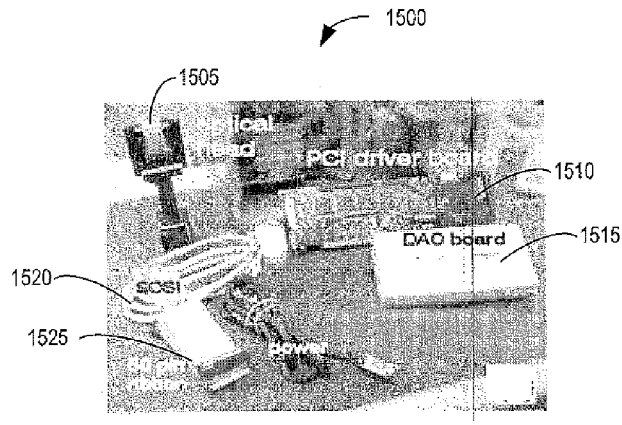
FIGS. 15A-B are photographs illustrating a 2D fine angle beam steering system in accordance with some embodiments of the present invention.
Figure 15B:
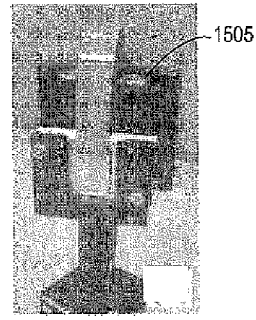

FIGS. 15A-B illustrate a 2D fine angle beam steering system 1500 in accordance with some embodiments of the present invention. In particular, the system 1500 was implemented using an optical head 1505, a driver board 1510, a DAC board 1515, and cables 1520, 1525, and 1530. The fine angle steering module of FIG. 15A was constructed by using two 1×12,288 element Optical Phased Arrays (OPAs), The two sets of OPAs were implemented at Boulder Nonlinear Systems (BNS), each with a 2 cm×2 cm aperture. The optical head 1505 of the system is further illustrated in FIG. 15B. This 2D fine angle steering system may provide up to about 90% or more throughput or transmittance (e.g., the ratio of output intensity to input intensity). This steering can cover a ±3.125° range in both the horizontal and vertical dimensions, and expands the steered beam by a factor of 2.5, thus reducing the steer angle by the same amount. For example, an incident beam with ±3.125° coverage and 2 cm diameter, may be expanded to a 5 cm diameter beam with a ±1.25° steering range. This beam passes through the coarse angle steering module having a steering resolution of 1.25° to cover a ±40° range in both dimensions.

As noted above, LCPGs in accordance with some embodiments of the present invention can function as highly efficient beam steering elements, by deflecting all of the incident light into one of the three diffraction orders. Several combinations of LCPGs and LC waveplates can perform this three-way steering, and can be implemented with active or passive PGs.

Figure 16A:
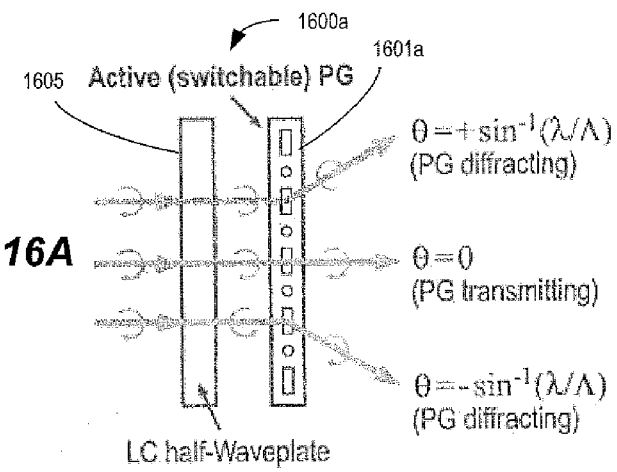
FIG. 16A illustrates an active PG nonmechanical beam steering stage in accordance with some embodiments of the present invention.
Figure 16B:
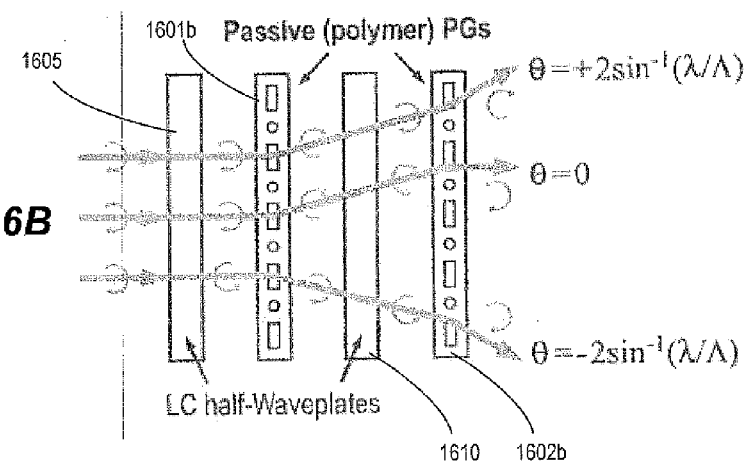
FIG. 16B illustrates a "passive" PG nonmechanical beam steering stage in accordance with some embodiments of the present invention.

FIGS. 16A-B illustrate primary configurations of a single LCPG wide angle stage 1600a which may be used in beam steering devices in accordance with some embodiments of the present invention. In particular, FIG. 16A illustrates an "active" PG beam steering stage 1600a, which includes an "active" (or switchable) PG 1601a and a variable LC half-waveplate 1605 as a switchable polarization selector. In this embodiment, the incident light is circularly polarized. The notation for Right Circularly Polarized (RCP) and Left Circularly Polarized (LCP) beams are shown the FIG. 16A. When no voltage is applied, the LC waveplate 1605 switches the handedness of the incident light (i.e. RCP→LCP or LCP→RCP), but under external applied voltage the LC waveplate 1605 allows the incoming light to pass through without changing its polarization state. From Eq. 4a and 4b, when d=λ/(2Δn), LCPGs according to some embodiments of the present invention may diffract RCP and LCP beams into the +1 and −1 orders respectively, with up to 100% efficiency. Hence, switching of the LC half-waveplate 1605 can be used to select the steering direction into one of the first orders, due to the polarization sensitive diffraction of the LCPG 1601a. Moreover, the active LCPG 1601a can steer substantially all of the incident light into the zero-order under an applied voltage. Therefore, this active LCPG steering stage 1600a can provide three unique steering directions corresponding to the three diffraction orders, by switching the voltage across both the elements 1605 and 1601a. Since this approach involves two switchable LC devices (e.g., the PG 1601a and the WP 1605), 4 glass substrates and 4 transparent-conducting-electrodes (not shown) may also be used to apply the respective switching voltages.

FIG. 16B illustrates a "passive" PG steering stage 1600b, which is also able to steer the incident light to three different directions. The stage 1600b includes two passive polymer PGs 1601b and 1602b and two variable LC half-waveplates 1605 and 1610 as switchable polarization selectors, which operate in a manner similar to the active PG steering stage 1600a illustrated in FIG. 16A. The embodiment of FIG. 16B uses the same number of active elements, but uses two passive PGs 1601b and 1602b and relies on two active LC waveplates 1605 and 1610 for switching the polarization state. Therefore, in this embodiment, the steering directions are determined by the voltage-states of the two LC waveplates 1605 and 1610, which are respectively positioned in front of the two passive PGs 1601b and 1602b. When both the waveplates 1605 and 1610 are in same state (i.e., both ON or both OFF), the diffraction from the first PG 1601b is compensated by the second PG 1602b to provide a zero-order output beam. When waveplates 1605 and 1610 are in opposite states, the incident beam can be diffracted into the positive or negative order. Accordingly, three steering directions are provided. Moreover, the passive PGs 1601b and 1602b are firm and thin (polymerized low-molecular weight LC molecules) and have a relatively small grating period, which provides a larger deflection angle. Since this embodiment includes two switchable LC devices 1605 and 1610 plus two polymer films 1601b and 1602b (on additional substrates), 6 glass substrates and 4 transparent-conducting-electrodes (not shown) may be used. Thus, while the passive PG approach may enable larger angles to be reached, each stage may be thicker and/or may have more interfaces.

Both the passive and active PG stages discussed above with reference to FIGS. 16A-16B can steer the incident light into three different directions, according to the voltages applied on their active elements. Several units like these can also be stacked or cascaded to implement a coarse, wide-angle beam steering system with an increased operation range, by arranging each single individual unit appropriately. Such a coarse beam steerer can provide wide-angle coverage of 80°×80° with a resolution of about 1.25°×1.25° in some embodiments.

FIGS. 17A-C illustrate a coarse beam steering device in accordance with some embodiments of the present invention. In particular, FIG. 17A illustrates the overall construction of the device 1700 with 10 single stages (5 for azimuth (AZ) 1710, 5 for elevation (EL) 1720), while FIGS. 17B and 17C illustrate that each stage 1710 and 1720 can be implemented with active waveplates 1705b and active PGs 1701b (FIG. 17B), or with active waveplates 1705c and passive PGs 1701c (FIG. 17C). The coarse beam steerer design in FIGS. 17A-17C is based on a ternary system, and follows a geometric progression. The diffraction angle of the first stage determines the resolution of coarse beam steerer, while the following stage's diffraction angle is double the previous stage's diffraction angle (e.g. 1.25°, 2.5°, 5°, etc). For a coarse beam steerer consisting of N single stages, a total of $2^{N+1}$ distinct steering angles may be provided. Therefore, in order to provide ±40' coverage with 1.25° resolution, five single stages (i.e. when N=5, $2^{N+1}$=64, which also equals the required resolution 2×(40°/1.25°)=64) may be used. As shown in FIGS. 17B and 17C, these single stages (1.25°, 2.5°, 5°, 10° and 20°) are cascaded in different directions to provide two-dimensional steering (AZ, EL). For example, in order to steer the incident light into 22.5° in azimuth and −16.25° in elevation angles respectively, each stage selectively generates the following states to steer the incident beam in this direction: $2.5°_{(stage2)}+20°_{(stage5)}=22.5°$ in AZ and $-1.25°_{(stage1)}-5°_{stage3})-10°_{(stage4)}=-16.25°$ in EL.

In both the embodiments of FIGS. 17A-C and the embodiments of FIGS. 18A-C discussed below, the geometric progression may be important. Accordingly, only one additional steering stage or element may be used to double the field-of-regard in any one dimension. In contrast, in the holographic glass approach, a doubling of the field-of-regard may require a doubling of the number of stages.

FIG. 18A-18C illustrate a coarse beam steering device in accordance with some embodiments of the present invention. In particular, FIG. 18A illustrates the overall construction of the device 1800 with 10 single stages (5 for azimuth (AZ) 1810, 5 for elevation (EL) 1820), while FIGS. 18B and 18C illustrate that each stage 1810 and 1820 can be implemented with an active waveplate 1805b and active PGs 1801b (FIG. 18B), or with active waveplates 1805c and passive PGs 1801c (FIG. 18C). This coarse beam steerer design is based on a ternary (three-state) system, and also follows a geometric progression. The number of elements in coarse steerer may be selected to make the system compact and to reduce losses from individual units, such as absorption from glass, transparent-conducting-electrodes, fresnel reflection losses at different interfaces, and/or scattering from the gratings. The ternary system of FIGS. 18A-C (based on ternary switching within each stage) can reduce the number of substrates and transparent-conductive-electrodes as compared to the ternary system of FIGS. 17A-C (see Table 2).

In particular, the ternary design of FIGS. 17A-C uses an essentially additive approach; it accumulates diffraction angles of each stage as the sign of the directions of angles are all same. In contrast, the ternary design of FIGS. 18A-C may add or subtract each diffraction angle selectively to make a final steering angle. This is possible because the PGs are configured to provide three-way diffraction angles depending on the handedness of incident polarization. As such, the embodiments of FIGS. 18A-C use positive and negative direction angles from each PG, and the angles may be accumulated selectively according to the applied voltage on PGs. As discussed above, the handedness of circular polarization is changed to the opposite state (e.g., RCP→LCP or LCP→RCP) when the beam passes through a PG having halfwave retardation. Thus, if the output beam passes through another PG, the direction of diffraction angle will be opposite from direction of diffraction angle from the previous PG. In this way, when circularly polarized light passes through the multiple PGs, the directions of diffraction angle are to be positive and negative repeatedly. By controlling the applied voltage on each PG, we can accumulate positive or negative diffraction angle by turns.

As shown in FIG. 18A, a ternary coarse beam steerer device 1800 in accordance with some embodiments of the present invention provides discrete coarse beam steering with 10 stages (i.e. 5 in AZ 1810, 5 in EL 1820). Each stage after the first stage in the embodiment of FIG. 18B includes a single active PG 1801b without the variable LC half-waveplate, while each stage in the embodiment of FIG. 18C includes a single passive PG 1801c and a variable LC half-waveplate 1805c. Note that a single variable LC half-waveplate for each dimension (AZ/EL) is still used. In particular, FIG. 18A shows the discrete coarse steerer design 1800 implemented with two modified stages. The modified stage consists of one LC half-waveplate 1805c and five active PGs 1801b having 1.25°, 3.75°, 8, 75°, 18.75° and 20° diffraction angles, as illustrated in FIG. 18B. The front LC waveplate 1805c may change the handedness of the incident polarization, and the following PGs 1801b control the diffraction orders to the zero- or first-order according to the voltages applied them. As such, some PGs 1801b may pass the beam without changing the angle of beam (e.g., if in the "on"-state), or may deflect the beam to one of the first orders depending on the handedness of incident polarization. Note that the last active PG 1801b' is interlaced as an antiparallel arrangement as compared with the other PGs 1801b, so that the last PG has its anisotropic profile of $n(\chi)=[\sin(\pi_\chi/\Lambda), -\cos(\pi_\chi/\Lambda,0)]$, where n is a unity vector describing the orientation of the linear birefringence. As used herein, a "parallel" polarization grating arrangement describes polarization gratings with the same birefringence $n(x)$, i.e., the respective birefringence patterns of first and second polarization gratings have substantially similar orientations. In contrast, an "antiparallel" polarization grating arrangement describes polarization gratings having opposite birefringence, i.e., $n(x)$ and $n(-x)$. In other words, the second polarization grating has a birefringence pattern that is inverted or globally rotated by about 180 degrees relative to that of the first polarization grating. Therefore, after passing through the last PG 1801b', RCP light is diffracted to negative direction and LCP light diffracted to positive direction, in contrast to other PGs. FIG. 18C includes a last passive PG 1801c' having a similar antiparallel arrangement as compared with the other PGs 1801c.

With the configuration of elements illustrated in FIGS. 18A-C, as shown in Table 1, coarse beam steering devices according to some embodiments of the present invention can steer light with a range of possible diffraction angles which can cover a proposed field of regard.

TABLE 1

Applied voltages on each element for ternary discrete coarse steerer design. Note that only a subset (0° to +15°) of the ±40° range is shown.

| Elements | State of Applied Voltages | | | | | | | | | | | | |
|---|---|---|---|---|---|---|---|---|---|---|---|---|---|
| LCWP | | | | | | | | | | | | | |
| PG1 (1.25°) | | +1.25° | -1.25° | | | +1.25° | -1.25° | | | +1.25° | -1.25° | | |
| PG2 (3.75°) | | | +3.75° | -3.75° | -3.75° | -3.75° | | | | | +3.75° | +3.75° | -3.75° |
| PG3 (8.75°) | | | | | -8.75° | -8.75° | -8.75° | -8.75° | -8.75° | -8.75° | -8.75° | -8.75° | |
| PG4 (18.75°) | | | | | | | | | +18.75° | +18.75° | +18.75° | +18.75° | +18.75° |
| PG5 (20.00°) | | | | | | | | | | | | | |
| Steering Angle | 0° | 1.25° | 2.5° | 3.75° | 5° | 6.25° | 7.5° | 8.75° | 10° | 11.25° | 12.5° | 13.75° | 15° |

 Non-Diffracting State (Voltage ON)

 Diffractiong State (Voltage OFF)

Table 1 shows the state (ON/OFF) of applied voltage on each element illustrated in FIGS. 18A-C, and describes the final steering angles provided by the coarse steering device. This embodiment may function similarly to the ternary design of FIGS. 17A-C, while using fewer elements. Because fewer elements are used, system losses may be reduced, and throughput or transmittance may be increased.

To compare the different embodiments of beam steering devices described above, the expected efficiency and losses from each element are defined according to the four parameters provided below (including the nominal best-case-value of each):

1. Intrinsic Efficiency—fraction of received light steered into the intended order: >99.5%.
2. Fresnel Loss—loss from reflections at interfaces of differing refractive indices: <0.1%.
3. Absorption Loss—loss due to absorption within the transparent-conducting-electrode layers: <0.2%.
4. Scattering Loss—loss from light randomly scattered by the PGs away from the steered direction: <0.3%.

TABLE 2

Performance comparison for different coarse steerer designs.

| | | Binary Passive PG Design | | Binary Active PG Design | | Ternary Active PG Design | |
|---|---|---|---|---|---|---|---|
| Parameter | Individual value | Component | Transmittance | Component | Transmittance | Component | Transmittance |
| Intrinsic Efficiency | 99.5% | 20 | 90.5% | 10 | 95.1% | 10 | 95.1% |
| Fresnel Loss | 0.1% | 40 | 96.1% | 20 | 98.0% | 12 | 98.8% |

TABLE 2-continued

Performance comparison for different coarse steerer designs.

| | | Binary Passive PG Design | | Binary Active PG Design | | Ternary Active PG Design | |
|---|---|---|---|---|---|---|---|
| Parameter | Individual value | Component | Transmittance | Component | Transmittance | Component | Transmittance |
| Absorption Loss | 0.2% | 40 | 92.3% | 40 | 92.5% | 24 | 95.3% |
| Scattering Loss | 0.3% | 20 | 94.2% | 10 | 97.0% | 10 | 97.0% |
| Total Transmittance (T) | | | 75.6% | | 83.4% | | 86.9% |

In Table 2, expected efficiency and losses are shown for different coarse steerer designs according to some embodiments of the present invention as illustrated in FIGS. 17A-18C. With these parameters, the total transmittance of each coarse steerer embodiment can be defined as follows:

$$T = (\eta_{int})^A \cdot (1-l_{fres})^B \cdot (1-l_{abs})^C \cdot (1-l_{scatter})^A \quad (7)$$

where T=total transmittance, $\eta_{int}$=intrinsic efficiency, $l_{fres}$=fresnel loss, $l_{abs}$=absorption loss, $=l_{scatter}$=scattering loss, A=number of PGs, B=number of plates, and C=number of transparent-conducting-electrodes. As noted above, a design with the fewest number of elements and transparent-conducting electrode layers may be advantageous from a loss analysis standpoint. The 80°×80° discrete beam steerer with 1.25° resolution according to some embodiments of the present invention may operate with a total transmittance of approximately 87%. By combining this with a fine angle steerer whose transmittance is around approximately 90%, the overall transmittance may be about 78% or more.

Figure 19:
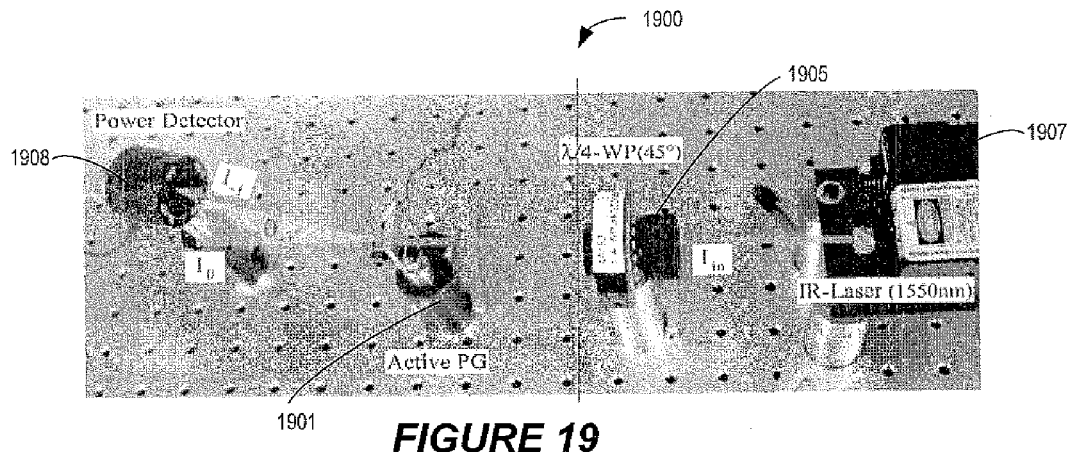
FIG. 19 is a photograph illustrating an experimental setup for a coarse beam steering device in accordance with some embodiments of the present invention.

FIG. 19 is a photograph illustrating an experimental setup 1900 for a coarse beam steering device in accordance with some embodiments of the present invention to measure the power of diffraction orders. As shown in FIG. 19, the polarization state of light coming from a 1550 nm diode laser source 1907 is changed from linear polarized state to a circularly polarized (RCP or LCP) state after passing through the quarter-wave plate 1905 whose axis is at 45°. The circularly polarized light may be selectively deflected to either the zero- or first-order according to the state of applied voltage on the active PG 1901. To select the direction of the first orders, a half-waveplate (not shown) can be used for changing the handedness of circular polarization. An IR power detector 1908 measures the far-field intensity at each diffraction order to calculate the efficiencies and transmittance of PGs.

In some embodiments of the present invention, a reactive mesogen mixture RMS03-001C (Merck, Δn=0.14 at 1550 nm) was used to fabricate the passive PGs, and nematic LC MDA-06-177 (Merck, Δn=0.13 at 1550 nm) was used for the active PGs. The thickness of the gratings is about 6.1 μm for the halfwave effective PG retardation, Δnd=λ/2. As discussed with reference to Eq. 4a and 4b, if the incident light is circularly polarized, (S″3=±1), the light is diffracted depending on the handedness of circular polarization. In the experimental data provided below, right handed circular polarization (RCP) light was used as input light, and three possible diffraction orders were measured with passive and active PGs according to some embodiments of the present invention having 5° and 10° diffraction angles.

TABLE 3

Characterization data of single PGs: passive and active types for different diffraction angles (λ = 1550 nm).

| Type of PG | θ±1 (deg) | I$_{in}$ (mW) | I$_{ref}$ (mW) | I$_{-1}$ (mW) | I$_0$ (mW) | I$_{+1}$ (mW) | T$_{-1}$ (%) | η$_{-1}^m$ (%) | η$_{-1}^t$ (%) |
|---|---|---|---|---|---|---|---|---|---|
| passive | ±5 | 41.32 | 37.91 | 37.83 | 0.07 | 0.01 | 91.4 | 99.6 | 99.8 |
| passive | ±10 | 41.32 | 37.91 | 37.44 | 0.07 | 0.01 | 91.1 | 99.3 | 99.8 |
| active | ±5 | 41.71 | 35.68 | 35.63 | 0.08 | 0.01 | 85.3 | 99.7 | 99.8 |
| active | ±10 | 41.82 | 35.68 | 33.71 | 0.11 | 0.005 | 80.6 | 94.5 | 99.7 |

Table 3 illustrates characterization data for passive and active single PGs for different diffraction angles, where Iin is the input power, Im is the diffracted power of order m, Tm=Im/Iin is the transmittance of order m, Iref is the transmitted power of substrate/cell filled with glue (used for reference), $$\eta\frac{a}{m} = \frac{I_m}{I_{ref}}$$

is the absolute diffraction efficiency of the grating, and $\eta_m^t$= (I−1+I0+I+1) is the intrinsic diffraction efficiency.

As used herein, "intrinsic diffraction efficiency" quantifies the inherent diffraction efficiency of the grating alone, normalizing out the effects of the substrates and any scattering. From this data, the efficiency of individual gratings is relatively high (>99.7%). As also used herein, "absolute diffraction efficiency" includes the effects of scattering, but also normalizes out the effect of the substrates. Both polymer (e.g., fixed) and switchable PGs perform with high efficiency (>99.3%), including scattering. However, the transmittance (including losses) in these measurements was between 80-91%. Accordingly, in some embodiments, almost all of the losses were due to the substrates and interfaces (note that neither anti-reflection coatings nor index-matched ITO were used). As the reflection and absorption losses in the substrates are improved, for example, by acquiring more optimum glass (AR-coated and index-matched), the overall transmittance may also be improved. In particular, significant losses may occur at the interfaces between elements. The reference intensity can be measured with the same element which has no grating. The measured value was almost lower than 90% of the input beam due to the Fresnel and absorption losses driving from the unmatched indices and the transparent-conducting-electrode layers of the surface. As such, some embodiments can provide the expected throughput or transmittance by using optimized substrates, which can use anti-reflection coatings and index-matched transparent-conducting-electrode layers to reduce losses.

Figure 20A:
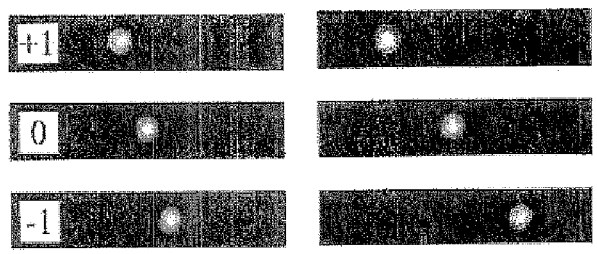
FIG. 20A is a photograph illustrating the influence of the grating period on diffraction angles for nonmechanical beam steering devices in accordance with some embodiments of the present invention.
Figure 20B:
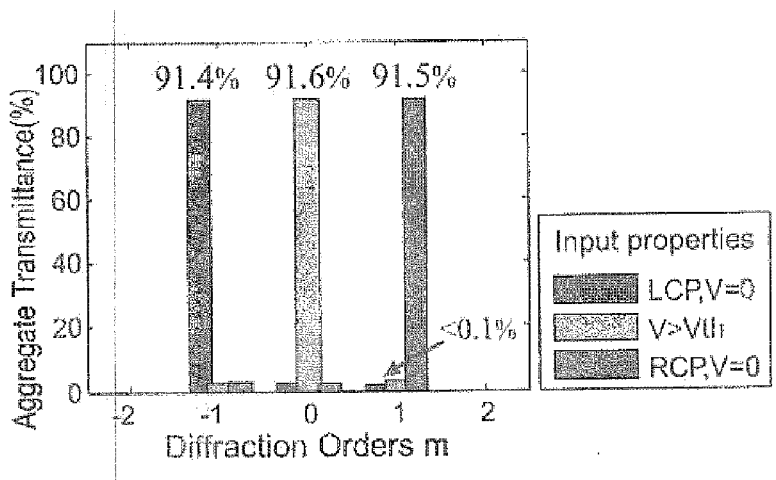
FIG. 20B is a graph illustrating aggregate transmittances for different diffraction orders for nonmechanical beam steering devices in accordance with some embodiments of the present invention.

In assembling the PGs and LC half-waveplates to provide beam steering devices according to some embodiments of the present invention, the parameters of single stage were characterized. In particular, three different steering directions using a 1550 nm wavelength laser were measured for different PG samples having ±5° and ±10° diffraction angles. Photographs of each diffraction order were achieved with IR sensitive detecting card which is 30 cm off from the PG, as shown in FIG. 20A. In particular, FIG. 20A shows the detected three orders and the different diffraction angles indicated with intervals between the orders; the longer grating period ($\Lambda=17.3$ μm) results in the smaller diffraction angle (5°), and the shorter grating period ($\Lambda=8.9$ μm) results in the larger diffraction angle (10°). In FIG. 20B, the aggregate transmittances (throughputs) are shown for different input properties. Three different conditions make three diffraction orders. Note that as the substrates used in these experiments were not optimized, the aggregate transmittance was lower than expected. However, good diffraction efficiency was shown, as all diffracted beams were detected at the proposed orders.

FIGS. 21A-C illustrate experimental results for multi-stage beam steering devices according to some embodiments of the present invention. In particular, FIG. 21A is a photograph of multi-stage steerer with two active-PGs and two HWPs (half-wave plates), FIG. 21B are photographs showing the diffracted beams from the multi-stage steerer, and FIG. 21C is a graph of the intrinsic efficiency for a 15-degrees diffracted beam. In these embodiments, the two single active PG stages were stacked to demonstrate seven different steering angles. Using the PGs having ±5° and ±10° diffraction angles, the stage can selectively control seven steering angles from −15° to +15° with 5° steps.

FIG. 21A illustrates the concept of multi-stage beam steering devices that can provide more than three steering angles. The multistage beam steering device 2100 contains two active PGs 2101 and 2102 and two active LC half-waveplates 2105 and 2110. Each active element is electrically controlled (switched) with a voltage through the wires. FIG. 21B presents seven diffracted beams from the multi-stage steerer. Spots were photographed with an IR sensitive detecting card located 40 cm off from the stage. The diffraction spots were well aligned relative to each other and no significant walkoff was observed. Experimentally demonstrated intrinsic efficiency (steering efficiency) may range from about 99.4% to about 99.6% for all seven diffraction beams (with the case of 15° diffraction angle), as shown in FIG. 21C.

Accordingly, some embodiments of the present invention provide wide-angle nonmechanical beam steering devices utilizing polarization gratings (PGs). Multiple layers of PGs may be used for coarse steering, with up to about a ±40° field-of-regard (in both elevation and azimuth) and about 1.25° resolution. Both passive and active PGs can be used for such coarse beam steerers, with up to 100% experimental diffraction efficiency into a single order at a wavelength of 1550 mm Overall system losses may be dependent on the interface and absorption properties of the substrates, and some embodiments may have overall system transmittance of as high as 87% or more (with improved substrates). Such coarse steering devices may have a thickness that is relatively thin, and practically independent of the beam diameter.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. For example, it is to be understood that the polarization gratings and/or the polarization selectors described above with reference to FIGS. 1-21 can be fabricated using non-switchable and/or switchable LC materials. Moreover, the substrates described herein may include one or more electrodes on surfaces thereof, for instance, provided by a transparent indium-tin-oxide (ITO) coating on the substrates.

Accordingly, many different embodiments stem from the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A beam steering apparatus, comprising:
a first beam steering stage comprising a first polarization grating having a first periodic uniaxial birefringence pattern; and
a second beam steering stage arranged in-line with the first beam steering stage and comprising a second polarization grating having a second periodic uniaxial birefringence pattern,
wherein at least one of the first polarization grating and the second polarization grating is operable to be independently rotated about an azimuth thereof.

2. A beam steering apparatus, comprising:
a first beam steering stage comprising a first polarization grating configured to redirect and alter a polarization of a polarized input beam incident thereon to output a first beam having a first propagation angle; and
a second beam steering stage arranged to receive the first beam from the first beam steering stage and comprising a second polarization grating configured to redirect and alter a polarization of the first beam incident thereon to output a second beam having a second propagation angle,
wherein at least one of the first polarization grating and the second polarization grating is operable to be independently rotated about an axis to rotate a propagation direction of a corresponding one of the first beam and the second beam such that the second beam is continuously steerable.

3. The apparatus of claim 2, wherein rotation of the one of the first polarization grating and the second polarization grating about the axis rotates the propagation direction of the corresponding one of the first beam and the second beam without substantially altering a corresponding one of the first propagation angle and the second propagation angle relative to a surface of the one of the first and second polarization gratings.

4. The apparatus of claim 3, wherein the input beam and the first beam have respective polarizations comprising one of a first polarization state and a second polarization state, and wherein the first polarization grating and the second polarization grating are configured to redirect the input beam and the first beam, respectively, into one of two different propagation directions depending on the respective polarizations thereof to provide the first beam and the second beam, respectively.

5. The apparatus of claim 4, wherein the first polarization grating and the second polarization grating respectively comprise a uniaxial birefringence pattern including a director orientation that varies in a periodic manner.

6. The apparatus of claim 5, wherein the first polarization state comprises left-handed circular polarization, wherein the second polarization state comprises right-handed circular polarization, and wherein the first polarization grating and the second polarization grating are configured to redirect the input beam and the first beam, respectively, into one of the two propagation directions depending on a handedness of the respective polarizations thereof such that the second beam is of a substantially single diffraction order.

7. The apparatus of claim 6, wherein the axis comprises a common axis for the first and second polarization gratings, and wherein each of the first and second polarization gratings is operable to be independently rotated about the common axis.

8. The apparatus of claim 7, wherein the first and second polarization gratings respectively comprise a polymerized liquid crystal layer.

9. The apparatus of claim 7, wherein at least one of the first and second polarization gratings comprises a switchable liquid crystal layer that is operable to be switched between a first state that does not substantially affect the polarization and the propagation angle of a corresponding one of the input beam and the first beam and a second state that alters the polarization and the propagation angle of the corresponding one of the input beam and the first beam.

10. The apparatus of claim 7, further comprising:
a third beam steering stage arranged to receive the second beam from the second beam steering stage and comprising a third polarization grating configured to redirect and alter a polarization of the second beam incident thereon to output a third beam having, a third propagation angle, wherein the third polarization grating is operable to be rotated about the axis independently of the first and/or second polarization gratings to rotate a propagation direction of the third beam without substantially altering the third propagation angle relative to a surface of the third polarization grating.

11. The apparatus of claim 5, wherein the periodic birefringence pattern of the first polarization grating has a first grating period, and wherein the periodic birefringence pattern of the second polarization grating has a second grating period different than the first grating period.

12. The apparatus of claim 1, wherein at least one of the first and second beam steering stages further comprises:
a polarization selector arranged to output circularly-polarized light as one of the input beam and the first beam to a corresponding one of the first polarization grating and the second polarization grating, respectively.

13. The apparatus of claim 12, wherein the polarization selector comprises a switchable liquid crystal layer that is operable to be switched between a first state that does not substantially affect polarization of light traveling therethrough and a second state that alters the polarization of the light traveling therethrough.

14. A beam steering apparatus, comprising:
a first beam steering stage comprising a first polarization grating having a first periodic uniaxial birefringence pattern and a polarization selector stacked thereon that is configured to provide a circularly polarized input beam incident on the first polarization grating; and
a second beam steering stage stacked on the first polarization grating opposite the polarization selector and comprising a second polarization grating having a second periodic uniaxial birefringence pattern.

15. A beam steering apparatus, comprising:
a first beam steering stage comprising a first polarization grating and a first polarization selector configured to be switched to provide a polarized input beam incident on the first polarization grating, wherein the first polarization grating is configured to alter a polarization of the input beam and alter a propagation angle thereof by a first angle to output a first beam; and
a second beam steering stage arranged to receive the first beam from the first beam steering stage and comprising a second polarization grating configured to alter a polarization of the first beam and alter a propagation angle thereof by a second angle to output a second beam.

16. The apparatus of claim 15, wherein the input beam and the first beam have respective polarizations comprising one of a first polarization state and a second polarization state, and wherein the first polarization grating and the second polarization grating are configured to redirect the input beam and the first beam, respectively, into one of two different propagation directions depending on the respective polarizations thereof to output the first beam and the second beam, respectively.

17. The apparatus of claim 16, wherein the first polarization grating and the second polarization grating respectively comprise a uniaxial birefringence pattern including a director orientation that varies in a periodic manner.

18. The apparatus of claim 17, wherein the first polarization state comprises left-handed circular polarization, wherein the second polarization state comprises right-handed circular polarization,
wherein the first polarization grating is configured to additively or subtractively alter the propagation angle of the input beam by the first angle depending on a handedness of the polarization thereof to output the first beam in one of the two propagation directions, and
wherein the second polarization grating is configured to additively or subtractively alter the propagation angle of the first beam by the second angle depending on a handedness of the polarization thereof to output the second beam in one of the two propagation directions such that the second beam is of a substantially single diffraction order.

19. The apparatus of claim 17, wherein at least one of the first polarization grating and the second polarization grating comprises a switchable liquid crystal layer that is operable to be switched between a first state that does not substantially affect the polarization and the propagation angle of a corresponding one of the input beam and the first beam, and a second state that alters the polarization and the propagation angle of the corresponding one of the input beam and the first beam.

20. The apparatus of claim 17, wherein the second stage further comprises:
a second polarization selector arranged to receive the first beam and configured to alter the polarization of the first beam between the first and second polarization states without substantially altering the propagation angle thereof and to provide the first beam having the altered polarization to the second polarization grating.

21. The apparatus of claim 20, wherein the second polarization selector comprises a birefringent plate.

22. The apparatus of claim 20, wherein at least one of the first and second polarization selectors comprises a switchable liquid crystal layer that is operable to be switched between a first state that does not substantially affect polarization of light traveling therethrough and a second state that alters the polarization of light traveling therethrough.

23. The apparatus of claim 22, wherein the first and second polarization selectors respectively comprise the switchable liquid crystal layer.

24. The apparatus of claim 22, wherein the first and second polarization gratings respectively comprise a polymerized liquid crystal layer.

25. The apparatus of claim 18, further comprising:
a third beam steering stage arranged to receive the second beam from the second beam steering stage and comprising at least a third polarization grating configured to alter a polarization of the second beam and to additively or subtractively alter a propagation angle of the second beam by a third angle depending on a handedness of the polarization thereof to output a third beam in one of the two propagation directions.

26. The apparatus of claim 17, wherein the periodic birefringence pattern of the second polarization grating is globally rotated relative to the periodic birefringence pattern of the first polarization grating,
wherein the first polarization grating is configured to alter the propagation angle of the input beam by the first angle in a first dimension to output the first beam, and
wherein the second polarization grating is configured to alter the propagation angle of the first beam by the second angle in a second dimension different than the first dimension to output the second beam.

27. The apparatus of claim 17, wherein the periodic birefringence pattern of the first polarization grating has a first grating period, and wherein the periodic birefringence pattern of the second polarization grating has a second grating period different than the first grating period.

28. The apparatus of claim 1, wherein the first and second periodic uniaxial birefringence patterns are in-plane, respectively, wherein the first and second polarization gratings are respectively configured to redirect and alter a polarization of light incident thereon, and wherein light output from the second beam steering stage is continuously steerable responsive to rotation of the at least one of the first and second polarization gratings.

29. The apparatus of claim 14, wherein the first and second periodic uniaxial birefringence patterns are in-plane, respectively, wherein the first and second polarization gratings are respectively configured to redirect and alter a polarization of light incident thereon, and wherein the polarization selector is configured to be switched to provide the circularly polarized input beam incident on the first polarization grating.

* * * * *

UNITED STATES PATENT AND TRADEMARK OFFICE
CERTIFICATE OF CORRECTION

PATENT NO. : 8,982,313 B2
APPLICATION NO. : 13/387942
DATED : March 17, 2015
INVENTOR(S) : Escuti et al.

It is certified that error appears in the above-identified patent and that said Letters Patent is hereby corrected as shown below:

In the Specification:

Column 6, Line 60: Please correct "FIG. 5A" to read -- FIG. 8A --

Column 6, Line 64: Please correct "FIG. 5B" to read -- FIG. 8B --

Column 14, Line 63: Please correct "2.5 thickness was"
to read -- 2.5 µm thickness was --

Column 16, Line 45: Please correct "about 1550 inn."
to read -- about 1550 nm. --

Column 23, Line 44: Please correct "about +40° in one"
to read -- about ±40° in one --

Column 27, Line 62: Please correct "±40' coverage"
to read -- ±40° coverage --

Column 29, Line 11: Please correct "n($\chi$)=[sin($\pi_\chi$/$\Lambda$), -cos($\pi_\chi$/$\Lambda$,0)],"
to read -- $n(\chi) = [\sin(\pi\chi / \Lambda), -\cos(\pi\chi / \Lambda, 0)]$, --

Column 31, Line 28: Please correct
"$T=(\eta_{int})^A \cdot (1-l_{fres})^B \cdot (1-l_{abs})^C \cdot (1-l_{scatter})^A$ (7)"
to read
-- $T = (\eta_{\text{int}})^A \cdot (1- \ell_{fres})^B \cdot (1- \ell_{abs})^C \cdot (1- \ell_{scatter})^A$ (7) --

Column 31, Line 31: Please correct
"$1_{fres}$=fresnel loss, $1_{abs}$=absorption loss, =$1_{scatter}$=scattering"
to read
-- $\ell_{fres}$ = fresnel loss, $\ell_{abs}$ = absorption loss, = $\ell_{scatter}$=scattering --

Signed and Sealed this
Fifth Day of January, 2016

Michelle K. Lee
*Director of the United States Patent and Trademark Office*

CERTIFICATE OF CORRECTION (continued)
U.S. Pat. No. 8,982,313 B2

In the Specification:

Column 32, TABLE 3, Line 2: Please correct "$\eta_{-1}{}^m (\%) \quad \eta_{-1}{}^l (\%)$" to read -- $\eta^m_{-1}\% \quad \eta^l_{-1}\%$ --

Column 32, Line 38: Please correct "and $\eta_m{}^t =$" to read -- and $\eta^i_m =$ --

Column 33, Line 56: Please correct "1550 mm." to read -- 1550 nm. --